(12) United States Patent
Roy et al.

(10) Patent No.: US 11,861,403 B2
(45) Date of Patent: Jan. 2, 2024

(54) METHOD AND SYSTEM FOR ACCELERATOR THREAD MANAGEMENT

(71) Applicant: NXP USA, Inc., Austin, TX (US)

(72) Inventors: Sourav Roy, Kolkata (IN); Arvind Kaushik, Noida (IN); Sneha Mishra, Gurgaon (IN); Howard Dewey Owens, Austin, TX (US); Joseph Gergen, Manchaca, TX (US)

(73) Assignee: NXP USA, Inc., Austin, TX (US)

( * ) Notice: Subject to any disclaimer, the term of this patent is extended or adjusted under 35 U.S.C. 154(b) by 295 days.

(21) Appl. No.: 17/071,927

(22) Filed: Oct. 15, 2020

(65) Prior Publication Data

US 2022/0121493 A1     Apr. 21, 2022

(51) Int. Cl.
*G06F 9/46* (2006.01)
*G06F 9/50* (2006.01)
(Continued)

(52) U.S. Cl.
CPC ............ *G06F 9/5011* (2013.01); *G06F 9/485* (2013.01); *G06F 9/5027* (2013.01);
(Continued)

(58) Field of Classification Search
CPC ...... G06F 9/5011; G06F 9/485; G06F 9/5027; G06F 2209/5018; G06F 16/2379
See application file for complete search history.

(56) References Cited

U.S. PATENT DOCUMENTS

| | | | |
|---|---|---|---|
| 6,856,950 B1 * | 2/2005 | Abts | G06F 30/33 703/22 |
| 7,447,873 B1 * | 11/2008 | Nordquist | G06F 9/3891 712/7 |

(Continued)

FOREIGN PATENT DOCUMENTS

| | | | | |
|---|---|---|---|---|
| CN | 107450978 A | * | 12/2017 | |
| GB | 2544530 A | * | 5/2017 | ........... G06F 9/5027 |

(Continued)

OTHER PUBLICATIONS

"Asynchronous Function Execution", Xilinx, 1 pg., retrieved from the Internet Oct. 14, 2020 at: https://www.xilinx.com/support/documentation/sw_manuals/xilinx2015_2/sdsoc_doc/topics/pragmasiconcept-asynchronous-function-execution-and-multiple-accelerator-instances.html.

*Primary Examiner* — Emerson C Puente
*Assistant Examiner* — Zhi Chen

(57) ABSTRACT

A thread management circuit of a processing system stores a thread identifier table and a thread completion table. The thread management circuit receives, from a processor core, a request for execution of a portion of an application by an accelerator circuit. The thread management circuit allocates a thread identifier available in the thread identifier table to the processor core for the execution of the portion by the accelerator circuit. The thread management circuit communicates a response and an acceleration request, both including the allocated thread identifier, to the processor core and the accelerator circuit, respectively. The thread management circuit communicates a thread joining response to the pro- (Continued)

cessor core based on a received thread joining request and an indication by the thread completion table that the execution of the portion by the accelerator circuit is complete. The executed portion is integrated with the application based on the thread joining response.

20 Claims, 11 Drawing Sheets

(51) Int. Cl.
*G06F 9/48* (2006.01)
*G06F 13/40* (2006.01)
*G06F 16/23* (2019.01)

(52) U.S. Cl.
CPC ...... *G06F 13/4027* (2013.01); *G06F 16/2379* (2019.01); *G06F 2209/5018* (2013.01)

(56) References Cited

U.S. PATENT DOCUMENTS

| | | | | |
|---|---|---|---|---|
| 9,146,902 | B2* | 9/2015 | Dickenson | G06F 17/16 |
| 9,747,107 | B2 | 8/2017 | Lin et al. | |
| 10,275,851 | B1* | 4/2019 | Zhao | G09G 5/363 |
| 2004/0078105 | A1* | 4/2004 | Moon | G06Q 10/10 |
| | | | | 700/100 |
| 2006/0271345 | A1* | 11/2006 | Kasuya | G06F 30/33 |
| | | | | 703/14 |
| 2011/0113220 | A1* | 5/2011 | Morishita | G06F 9/544 |
| | | | | 712/30 |
| 2013/0239113 | A1* | 9/2013 | Kurihara | G06F 9/46 |
| | | | | 718/103 |
| 2013/0247048 | A1* | 9/2013 | Le Saux | G06F 1/3203 |
| | | | | 718/1 |
| 2014/0082624 | A1* | 3/2014 | Iwabuchi | G06F 9/4881 |
| | | | | 718/102 |
| 2014/0101405 | A1* | 4/2014 | Papadopoulou | G06F 12/1027 |
| | | | | 711/207 |
| 2014/0143788 | A1* | 5/2014 | Kurihara | G06F 9/5016 |
| | | | | 718/104 |
| 2016/0139942 | A1* | 5/2016 | Tsirkin | G06F 9/45558 |
| | | | | 718/1 |
| 2018/0373512 | A1* | 12/2018 | Li | G06F 9/522 |
| 2019/0392166 | A1* | 12/2019 | Awad | G06F 21/6281 |
| 2020/0004610 | A1* | 1/2020 | Hamidouche | G06F 12/023 |
| 2020/0364516 | A1* | 11/2020 | Krasner | G06N 3/088 |
| 2021/0374208 | A1* | 12/2021 | Collier | G06F 9/5066 |

FOREIGN PATENT DOCUMENTS

| | | | | |
|---|---|---|---|---|
| JP | 08166929 | A * | 6/1996 | |
| JP | 2014139702 | A * | 7/2014 | G06F 9/45558 |

* cited by examiner

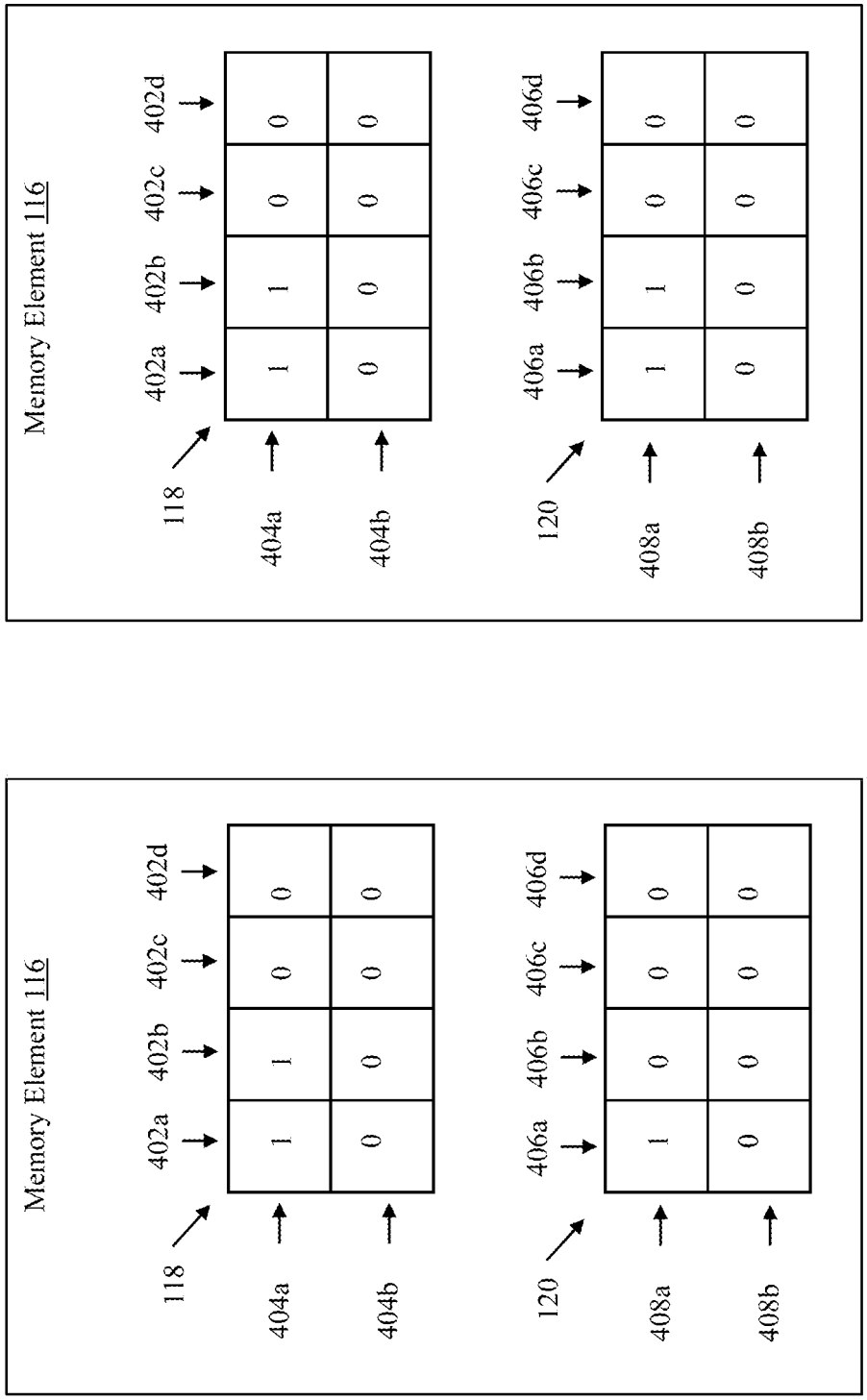

METHOD AND SYSTEM FOR ACCELERATOR THREAD MANAGEMENT

BACKGROUND

The present disclosure relates generally to electronic circuits, and, more particularly, to thread management in parallel programming architectures.

Advancements in technology have led to the development of parallel programming architectures that involve use of hardware accelerator circuits. Such hardware accelerator circuits typically include specialized hardware that enables fast and efficient execution of portions or threads of an application. Examples of hardware accelerator circuits include, but are not limited to, graphics processing units, digital signal processors, direct memory access controllers, field programmable gate arrays, application-specific integrated circuits, or the like.

In computing systems utilizing parallel architecture or parallel programming, multiple portions or threads of an application may be offloaded by a processor core to a hardware accelerator circuit for fast and efficient execution. This necessitates efficient thread management for tracking a state (e.g., execution pending, execution complete, or the like) of each offloaded thread. Further, efficient thread management is required for enabling seamless integration of executed threads with the application.

Conventional solutions for thread management involve software-based allocation of thread identifiers to threads of an application that are offloaded by the processor core for execution by a hardware accelerator circuit. A thread identifier allocated to each offloaded thread or portion enables tracking of a state of each thread and facilitates integration of each thread with the application. Software-based allocation of thread identifiers entails pre-allocation of the thread identifiers to the offloaded threads by a software developer in software code. Such pre-allocation is typically realized during software compilation or execution of the application.

However, software-based allocation does not scale well for applications (e.g., applications associated with single program multiple data or SPMD environments) that require a large number of threads to be offloaded for execution by hardware accelerator circuits. An example of such an application is a routing application that requires multiple processor cores to concurrently execute the same application. In such a scenario, the software developer is required to pre-allocate thread identifiers to each thread or portion, while accounting for each thread or portion that may be offloaded by each processor core. Further, the software developer may be required to anticipate a completion of the execution of each offloaded thread and enable re-allocation of freed-up thread identifiers. Therefore, software-based allocation of thread identifiers is rendered virtually incompatible with applications that require management of a large number of threads offloaded for execution.

In light of the aforementioned drawbacks, there exists a need to develop an efficient and scalable technical solution for thread management in hardware accelerator-based parallel programming architecture.

SUMMARY

In one embodiment, a processing system is disclosed. The processing system includes a processor core configured to execute an application, an accelerator circuit, and a thread management circuit coupled to the processor core and the accelerator circuit. The thread management circuit is configured to store therein, a thread identifier table and a thread completion table. The thread management circuit is further configured to receive, from the processor core, a first request for execution of a first portion of the application by the accelerator circuit. The thread management circuit is further configured to allocate, based on the received first request, a first thread identifier available in the thread identifier table to the processor core for the execution of the first portion by the accelerator circuit. The thread management circuit is further configured to communicate, based on the allocation of the first thread identifier, a first response to the processor core. The first response includes the allocated first thread identifier. The thread management circuit is further configured to communicate a first acceleration request, including the first thread identifier, to the accelerator circuit for the execution of the first portion. The thread management circuit is further configured to receive, from the processor core, a thread joining request after the reception of the first request. The thread management circuit is further configured to communicate to the processor core, based on the thread joining request, a thread joining response including the first thread identifier. The thread joining response is communicated to the processor core based on an indication by the thread completion table that the execution of the first portion by the accelerator circuit is complete. The processor core is further configured to integrate the executed first portion with the application, based on the thread joining response.

In another embodiment, thread management circuit coupled with a processor core and an accelerator circuit for thread management is disclosed. The thread management circuit includes a memory element configured to store a thread identifier table and a thread completion table. The thread management circuit further includes processing circuitry coupled to the memory element. The processing circuitry is configured to receive, from the processor core, a first request for execution of a first portion of an application by the accelerator circuit. The processing circuitry is further configured to allocate, based on the received first request, a first thread identifier available in the thread identifier table to the processor core for the execution of the first portion by the accelerator circuit. The processing circuitry is further configured to communicate, based on the allocation of the first thread identifier, a first response to the processor core. The first response includes the allocated first thread identifier. The processing circuitry is further configured to communicate a first acceleration request including the first thread identifier to the accelerator circuit for the execution of the first portion. The processing circuitry is further configured to receive, from the processor core, a thread joining request after the reception of the first request. The processing circuitry is further configured to communicate, to the processor core, a thread joining response including the first thread identifier based on the thread joining request. The thread joining response is communicated to the processor core based on an indication by the thread completion table that the execution of the first portion by the accelerator circuit is complete. The executed first portion is integrated with the application, based on the thread joining response.

In another embodiment, a method for thread management is disclosed. A thread identifier table and a thread completion table are stored by a thread management circuit therein. A first request, from a processor core, for execution of a first portion of an application by an accelerator circuit is received by the thread management circuit. Based on the received first request, a first thread identifier available in the thread identifier table is allocated to the processor core, by the thread management circuit, for the execution of the first portion by the accelerator circuit. Based on the allocation of the first thread identifier, a first response is communicated to the processor core by the thread management circuit. The first response includes the allocated first thread identifier. A first acceleration request including the first thread identifier is communicated, by the thread management circuit, to the accelerator circuit for the execution of the first portion. A thread joining request is received, by the thread management circuit, from the processor core after the reception of the first request. Based on the thread joining request, a thread joining response is communicated to the processor core, by the thread management circuit. The thread joining response is communicated to the processor core based on an indication by the thread completion table that the execution of the first portion by the accelerator circuit is complete. The executed first portion is integrated with the application by the processor core, based on the thread joining response.

In some embodiments, the processing system further includes a shared memory that is configured to store input data for the execution of the first portion by the accelerator circuit. The thread management circuit is further configured to read, from the shared memory, the input data. The communication of the first acceleration request is based on the reading of the input data by the thread management circuit.

In some embodiments, the accelerator circuit is configured to execute the first portion based on the first acceleration request received from the thread management circuit. The accelerator circuit is further configured to generate a first acceleration response when the execution of the first portion is complete. The first acceleration response includes the first thread identifier. The thread management circuit is further configured to receive the first acceleration response from the accelerator circuit. The thread management circuit is further configured to update, based on the first acceleration response, the thread completion table to indicate that the execution of the first portion by the accelerator circuit is complete.

In some embodiments, the thread management circuit is further configured to receive, from the processor core, a second request for execution of a second portion of the application by the accelerator circuit. The second request is received after the first request. The thread management circuit is further configured to allocate, based on the received second request, a second thread identifier available in the thread identifier table to the processor core for the execution of the second portion by the accelerator circuit. The thread management circuit is further configured to communicate, based on the allocation of the second thread identifier, a second response to the processor core. The second response includes the allocated second thread identifier. The thread management circuit is further configured to communicate a second acceleration request including the second thread identifier to the accelerator circuit for execution of the second portion.

In some embodiments, the thread joining request is of a first type and includes the first thread identifier.

In some embodiments, when the thread joining request is of a second type and is received after the second request, the thread management circuit is further configured to determine based on the thread completion table whether the execution of the first and second portions by the accelerator circuit is complete. The thread management circuit is further configured to halt the communication of the thread joining response based on the determination that the execution of at least one of the first and second portions by the accelerator circuit is incomplete. The thread joining response is communicated by the thread management circuit when the thread completion table indicates that the execution of the first and second portions is complete. The thread joining response further includes the second thread identifier, and the processor core is further configured to integrate the executed second portion with the application based on the thread joining response.

In some embodiments, when the thread joining request is of a third type and is received after the second request and prior to the completion of the execution of the second portion by the accelerator circuit, the thread management circuit is further configured to determine based on the thread completion table whether the execution of at least one of the first and second portions by the accelerator circuit is complete. The thread joining response including the first thread identifier is communicated when the thread completion table indicates that the execution of the first portion is complete and the execution of the second portion is incomplete.

In some embodiments, the thread management circuit is further configured to update the thread identifier table after the communication of the thread joining response, to indicate that the first thread identifier is available for re-allocation.

In some embodiments, the accelerator circuit is further configured to write a result of the execution of the first portion to the shared memory. The processor core is further configured to read the result from the shared memory for integrating the executed first portion with the application.

Various embodiments of the present disclosure present a processing system that includes a processor core, an accelerator circuit, a shared memory, and a thread management circuit. The processor core is configured to execute an application. The thread management circuit is coupled to the processor core and the accelerator circuit, and is configured to store therein, a thread identifier table and a thread completion table. The thread management circuit is configured to receive, from the processor core, a first request for execution of a first portion of the application by the accelerator circuit. The thread management circuit is further configured to allocate, based on the received first request, a first thread identifier available in the thread identifier table to the processor core for the execution of the first portion by the accelerator circuit. The thread management circuit is further configured to communicate a first response to the processor core to indicate that the first thread identifier is allocated to the processor core for the execution of the first portion. For the execution of the first portion, the thread management circuit is configured to communicate a first acceleration request including the first thread identifier to the accelerator circuit. The accelerator circuit is configured to execute the first portion based on the first acceleration request and write a result of the execution of the first portion to the shared memory. The accelerator circuit is further configured to generate a first acceleration response when the execution of the first portion is complete. The first acceleration response includes the first thread identifier. The thread management circuit is further configured to receive the first acceleration response from the accelerator circuit. Based on the first acceleration response, the thread management circuit is configured to update the thread completion table to indicate that the execution of the first portion by the accelerator circuit is complete.

After the reception of the first request, the thread management circuit is configured to receive, from the processor core, a thread joining request. Based on the thread joining request, the thread management circuit is configured to communicate, to the processor core, a thread joining response including the first thread identifier. The thread joining response is communicated to the processor core based on an indication by the thread completion table that the execution of the first portion by the accelerator circuit is complete. The processor core is further configured to integrate the executed first portion with the application, based on the thread joining response. The thread management circuit is further configured to update the thread identifier table after the communication of the thread joining response, to indicate that the first thread identifier is available for re-allocation. The processor core is further configured to read the result from the shared memory for integrating the executed first portion with the application.

Thus, the thread management circuit of the present disclosure facilitates seamless thread management in an accelerator-based parallel programming environment. The thread management circuit receives, from the processor core, various portions (e.g., the first portion) of the application for execution by the accelerator circuit. The thread identifier table and the thread completion table, stored in the thread management circuit, enable fast and easy tracking of a completion status of each portion received for execution. Dynamic allocation (and re-allocation) of thread identifiers (e.g., the first thread identifier) results in optimized utilization of thread identifiers available in the thread identification table, thereby avoiding cumbersome software-based allocation of thread identifiers. The thread management circuit facilitates execution of portions and integration of the executed portions in the application. This results in increased speeds and lower latency times for thread management in the processing system.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

FIGS. 4A-4E, collectively illustrate a thread identifier table and a thread completion table of FIG. 1 at various time-instances in accordance with an exemplary embodiment of the present disclosure;

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
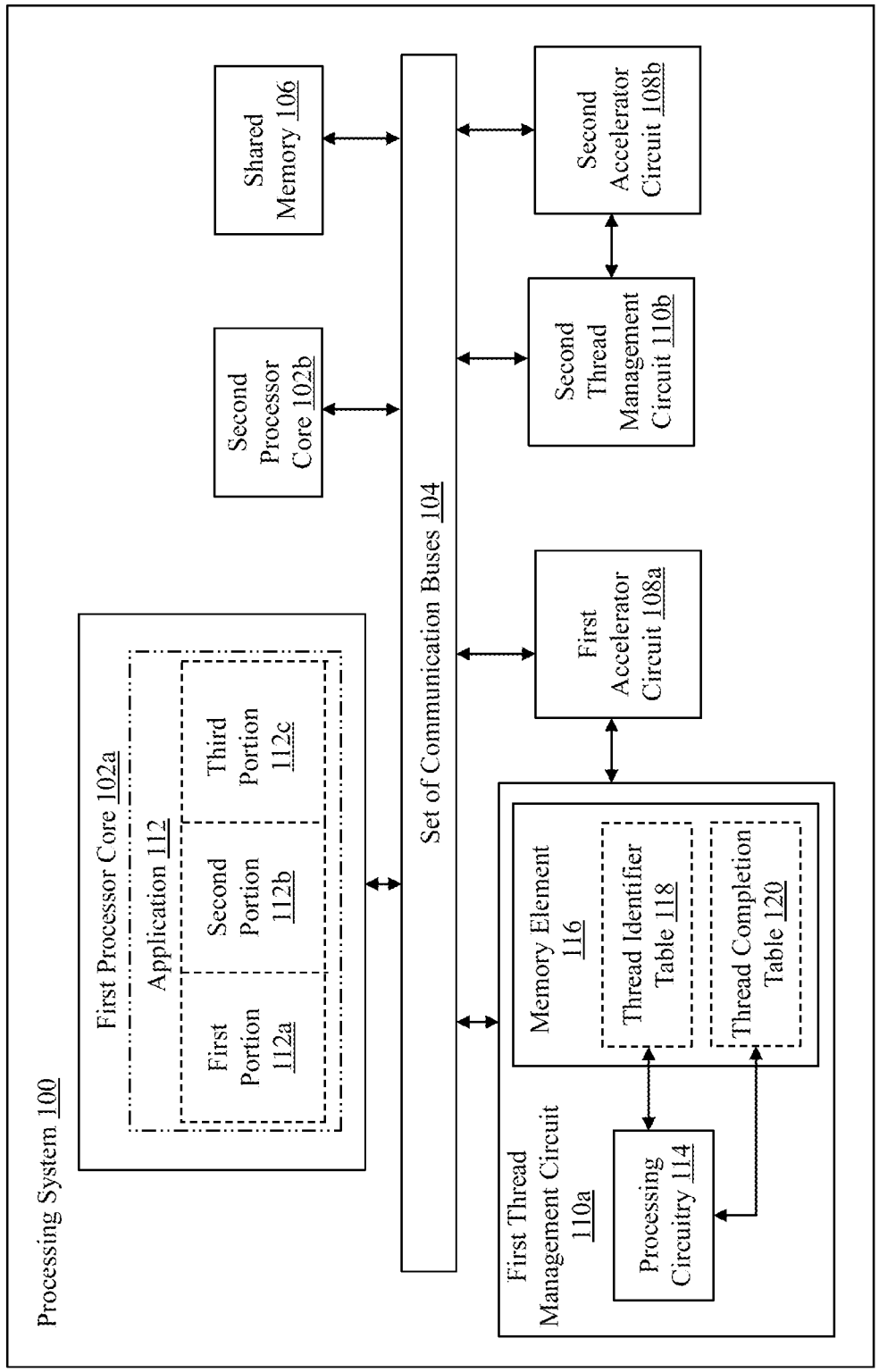
FIG. 1 illustrates a schematic block diagram of a processing system in accordance with an exemplary embodiment of the present disclosure.

FIG. 1 illustrates a schematic block diagram of a processing system 100 in accordance with an exemplary embodiment of the present disclosure. The processing system 100 includes a set of processor cores of which first and second processor cores 102a and 102b are shown. The first processor core 102a and the second processor core 102b are interchangeably referred to as "the processor core 102a" and "the processor core 102b", respectively. The processing system 100 further includes a set of communication buses 104, a shared memory 106, first and second accelerator circuits 108a and 108b, and first and second thread management circuits 110a and 110b. It will be understood by those of ordinary skill in the art that the processing system 100 may include various other circuits and systems (e.g., communication modules, device drivers, peripherals, or the like) for its operation, which are not shown in order not to obscure the disclosure. The first accelerator circuit 108a and the second accelerator circuit 108b are interchangeably referred to as "the accelerator circuit 108a" and "the accelerator circuit 108b", respectively. The first thread management circuit 110a and the second thread management circuit 110b are interchangeably referred to as "the thread management circuit 110a" and "the thread management circuit 110b", respectively.

Each processor core 102a and 102b is coupled to the set of communication buses 104 and is configured to execute (or run) various applications. For example, as shown in FIG. 1, the first processor core 102a executes an application 112. Examples of such applications may include, but are not limited to, image processing applications, audio or video processing applications, machine learning applications, data processing applications, network routing applications, or the like. In one embodiment, each processor core 102a and 102b is configured to run multiple applications concurrently. However, for the sake of brevity, the first processor core 102a is shown to execute a single application (i.e., the application 112). The application 112 may include various portions (or threads) of which first through third portions 112a-112c are shown. Hereinafter, the terms "portion" and "thread" are used interchangeably throughout the disclosure. Concept of threads is well known to those of skill in the art.

Each processor core 102a and 102b is configured to communicate various requests via the set of communication buses 104 to the first and second thread management circuits 110a and 110b for hardware-accelerated execution of one or more portions of the executed applications. For example, the first processor core 102a may communicate a first request to the first thread management circuit 110a for execution (i.e., hardware-accelerated execution) of the first portion 112a by the first accelerator circuit 108a. In other words, the first processor core 102a communicates the first request to the first thread management circuit 110a to offload the execution of the first portion 112a to the first accelerator circuit 108a.

The first request includes an identifier (e.g., a domain identifier) of the first processor core 102a and an identifier of the first accelerator circuit 108a. Further, the first request is indicative of a set of operations to be performed by the first accelerator circuit 108a for executing the first portion 112a. After offloading the execution of the one or more portions, each processor core 102a and 102b initiates the execution of a subsequent portion of the corresponding executed applications. For example, after offloading the execution of the first portion 112a, the first processor core 102a initiates the execution of another portion (e.g., the second portion 112b and/or the third portion 112c) of the application 112.

Each processor core 102a and 102b is further configured to communicate thread joining requests to the first and second thread management circuits 110a and 110b for joining one or more offloaded portions with other portions being executed by the corresponding processor cores 102a and 102b. For example, the first processor core 102a may communicate a thread joining request to the first thread management circuit 110a for joining the first portion 112a with the third portion 112c being executed by the first processor core 102a.

When the thread joining requests are communicated by the first and second processor cores 102a and 102b, each processor core 102a and 102b halts the execution of the portions that are currently being executed, until a result of the execution of the one or more offloaded portions is received by each processor core 102a and 102b. For example, when a thread joining request is communicated by the first processor core 102a, the first processor core 102a halts the execution of the current portion (e.g., the third portion 112c) until a result of the execution of the first portion 112a is received by the first processor core 102a. Each thread joining request may be one of a first type (i.e., Join (id)), a second type (i.e., Join (all)), or a third type (i.e., Join (any)). A thread joining request of the first type, communicated by the first processor core 102a or the second processor core 102b, is a request for enquiring whether execution of a specific offloaded portion is complete. A thread joining request of the second type, communicated by the first processor core 102a or the second processor core 102b, is a request for enquiring whether execution of each previously offloaded portion is complete. A thread joining request of the third type, communicated by the first processor core 102a or the second processor core 102b, is a request for enquiring whether execution of any offloaded portion is complete. Thread joining requests are explained in further detail in conjunction with FIG. 3.

Based on the result of the execution of each of the one or more offloaded portions, each processor core 102a and 102b is configured to integrate the executed one or more portions with the corresponding executed applications and resume the halted execution of other portions. For example, the first processor core 102a integrates the first portion 112a with the application 112 and resumes the execution of the third portion 112c. Operations performed by the first processor core 102a are explained in detail in conjunction with FIGS. 2A and 2B, 3, 5A and 5B, and 6A-6C.

Each processor core 102a and 102b may be implemented by way of central processing units, processors, microprocessors, electronic control units, microcontroller units, and the like. Although the processing system 100 is shown to include two processor cores (i.e., the first and second processor cores 102a and 102b), it will be apparent to those of skill in the art that the processing system 100 may include any number of processor cores without deviating from the scope of the disclosure.

The set of communication buses 104 is configured to facilitate communication between the first and second processor cores 102a and 102b, the shared memory 106, the first and second accelerator circuits 108a and 108b, the first and second thread management circuits 110a and 110b, and any other component on the processing system 100. For example, the set of communication buses 104 receives the first request from the first processor core 102a and communicates the first request to the first thread management circuit 110a. The set of communication buses 104 may include a set of system buses, a set of peripheral buses, a set of address buses, a set of data buses, a set of control buses, a set of user buses, or a combination thereof. The set of communication buses 104 may be compliant with various bus protocols. The bus protocols may include, but are not limited to, an advanced microcontroller bus architecture (AMBA) protocol, an advanced high performance (AHB) bus protocol, or the like. The bus protocols may further include an advanced system bus (ASB) protocol, an advanced peripheral bus (APB) protocol, an advanced extensible interface (AXI) protocol, or the like.

The shared memory 106 is coupled to the set of communication buses 104 and is configured to store data (i.e., input data) required for the execution of the one or more offloaded portions. The shared memory 106 is further configured to store results of the execution of the one or more offloaded portions, for reading by the processor cores 102a and 102b. In one embodiment, the shared memory 106 may be a dynamic random-access memory (DRAM) that is external to the first and second processor cores 102a and 102b. In another embodiment, the shared memory 106 may be a static random-access memory (SRAM) that is located within the first processor core 102a. In some embodiments, the shared memory 106 may include specific segments or portions, each of which may be assigned to the accelerator circuit 108a or 108b for execution of portions or threads by the corresponding accelerator circuit 108a or 108b.

The first accelerator circuit 108a is coupled to the set of communication buses 104 and the first thread management circuit 110a. Similarly, the second accelerator circuit 108b is coupled to the set of communication buses 104 and the second thread management circuit 110b. Each accelerator circuit 108a and 108b includes dedicated hardware that is configured to execute the one or more portions of the various applications being executed by the first and second processor cores 102a and 102b. In other words, the execution of the one or more portions of the various applications may be offloaded to each accelerator circuit 108a and 108b by the first and second processor cores 102a and 102b.

The first accelerator circuit 108a is further configured to receive acceleration requests for execution of the one or more portions from the first thread management circuit 110a. The first accelerator circuit 108a is further configured to communicate, to the first thread management circuit 110a, acceleration responses following completion of the execution of the one or more portions by the first accelerator circuit 108a. Similarly, the second accelerator circuit 108b is configured to receive acceleration requests for execution of the one or more portions from the second thread management circuit 1106. The second accelerator circuit 1086 is configured to communicate, to the second thread management circuit 110b, acceleration responses following a completion of the execution of the one or more portions by the second accelerator circuit 108b.

Examples of the first and second accelerator circuits 108a and 108b include, but are not limited to, central processing units (CPUs), graphics processing units (GPUs), digital signal processors (DSPs), direct memory access (DMA) controllers, field programmable gate arrays (FPGAs), application specific integrated circuits (ASICs), or the like. Examples of the first and second accelerator circuits 108a and 108b further include network processors, network interface controllers, crypto-processors, artificial intelligence (AI) accelerators, systolic arrays, or the like. Although the processing system 100 is shown to include two accelerator circuits (i.e., the first and second accelerator circuits 108a and 108b), it will be apparent to those of skill in the art that the processing system 100 may include any number of accelerator circuits without deviating from the scope of the disclosure.

The first and second thread management circuits 110a and 110b are coupled to the first and second processor cores 102a and 102b by way of the set of communication buses 104. The first thread management circuit 110a is further coupled to the first accelerator circuit 108a and the second thread management circuit 110b is further coupled to the second accelerator circuit 108b.

The first thread management circuit 110a is configured to facilitate accelerator thread management for the execution of the one or more portions of the various applications by the first accelerator circuit 108a. The first thread management circuit 110a is further configured to facilitate accelerator thread management for the integration of the executed one or more portions with the various applications. The first thread management circuit 110a includes processing circuitry 114 and a memory element 116, such that the processing circuitry 114 is coupled to the memory element 116.

The memory element 116 may be realized by way of a plurality of flip-flops. The memory element 116 is configured to store a thread identifier table 118 and a thread completion table 120. The thread identifier table 118 indicates an availability (e.g., "allocated" or "available for allocation") of a set of thread identifiers of the first thread management circuit 110a. It will be apparent to those of skill in the art that the set of thread identifiers may include any number of thread identifiers. For the sake of brevity, it is assumed that the set of thread identifiers includes first through fourth thread identifiers. In other words, four thread identifiers (i.e., the first through fourth thread identifiers) are available with the first thread management circuit 110a for allocation. The thread completion table 120 is indicative of a completion status of each portion that is allocated a thread identifier of the first through fourth thread identifiers.

The processing circuitry 114 includes suitable logic, circuitry, interfaces, and/or code, executable by the circuitry, for performing requisite operations for facilitating accelerator thread management. In one embodiment, the processing circuitry 114 may be realized by way of sequential or combinational logic circuits. The processing circuitry 114 is configured to receive, from the processor cores 102a and 102b, the requests for execution of the one or more portions by the first accelerator circuit 108a. The processing circuitry 114 is configured to allocate, to the processor cores 102a and 102b, available thread identifiers for the execution of the one or more portions by the first accelerator circuit 108a. The processing circuitry 114 is further configured to update the thread identifier table 118 based on the allocation of the thread identifiers. The processing circuitry 114 is fluffier configured to communicate responses to the processor cores 102a and 102b, such that the responses include the allocated thread identifiers. The processing circuitry 114 is further configured to communicate, to the first accelerator circuit 108a, acceleration requests for the execution of the one or more portions by the first accelerator circuit 108a. The processing circuitry 114 is further configured to receive acceleration responses from the first accelerator circuit 108a. The acceleration responses may be indicative of a completion of the execution of the one or more portions by the first accelerator circuit 108a. The processing circuitry 114 is further configured to update the thread completion table 120 to indicate the completion of the execution of the one or more portions, based on the acceleration responses.

The processing circuitry 114 is further configured to receive, from the processor cores 102a and 102b, thread joining requests after the reception of the requests for the execution of the one or more portions. The processing circuitry 114 is further configured to communicate, to the processor cores 102a and 102b, thread joining responses, based on the received thread joining requests. The processing circuitry 114 is further configured to update the thread identifier table and the thread completion table 120, based on the communication of the thread joining responses. The processor cores 102a and 102b may integrate the executed one or portions with the various applications (e.g., the first portion 112a with the application 112) based on the thread joining responses. It will be apparent to those of skill in the art that the second thread management circuit 110b is similar to the first thread management circuit 110a in terms of structure and function.

In operation, the first processor core 102a is configured to execute the application 112 and communicates the first request to the first thread management circuit 110a for the execution of the first portion 112a by the first accelerator circuit 108a. Following the communication of the first request, the first processor core 102a may execute another portion (e.g., the third portion 112c) of the application 112. In other words, the first processor core 102a may not wait for the first portion 112a to be executed before proceeding to execute other portions of the application 112. Based on the received first request, the processing circuitry 114 allocates the first thread identifier, available in the thread identifier table 118, to the first processor core 102a for the execution of the first portion 112a. The processing circuitry 114 updates the thread identifier table 118 to indicate the allocation of the first thread identifier to the first processor core 102a. Based on the allocation of the first thread identifier, the processing circuitry 114 communicates a first response to the first processor core 102a. The first response includes the allocated first thread identifier and indicates the allocation of the first thread identifier for the execution of the first portion 112a. The processing circuitry 114 further communicates, to the first accelerator circuit 108a, a first acceleration request for the execution of the first portion 112a. The first acceleration request includes the allocated first thread identifier.

When the execution of the first portion 112a is complete, the first accelerator circuit 108a generates and communicates a first acceleration response to the first thread management circuit 110a. The first acceleration response includes the first thread identifier and is indicative of the completion of the execution of the first portion 112a. Further, the first accelerator circuit 108a may write a first execution result of the execution of the first portion 112a to the shared memory 106.

The processing circuitry 114 receives, from the first processor core 102a, a thread joining request after the reception of the first request. Based on the received thread joining request and an indication by the thread completion table 120 that the execution of the first portion 112a is complete, the processing circuitry 114 communicates a thread joining response to the first processor core 102*a*. The thread joining response includes the first thread identifier and indicates the completion of the execution of the first portion 112*a* by the first accelerator circuit 108*a*. Based on the thread joining response, the first processor core 102*a* accesses the shared memory 106 and reads (i.e., retrieves) the first execution result from the shared memory 106. The first processor core 102*a* integrates the executed first portion 112*a* with the application 112, based on the read first execution result.

Figure 2A:
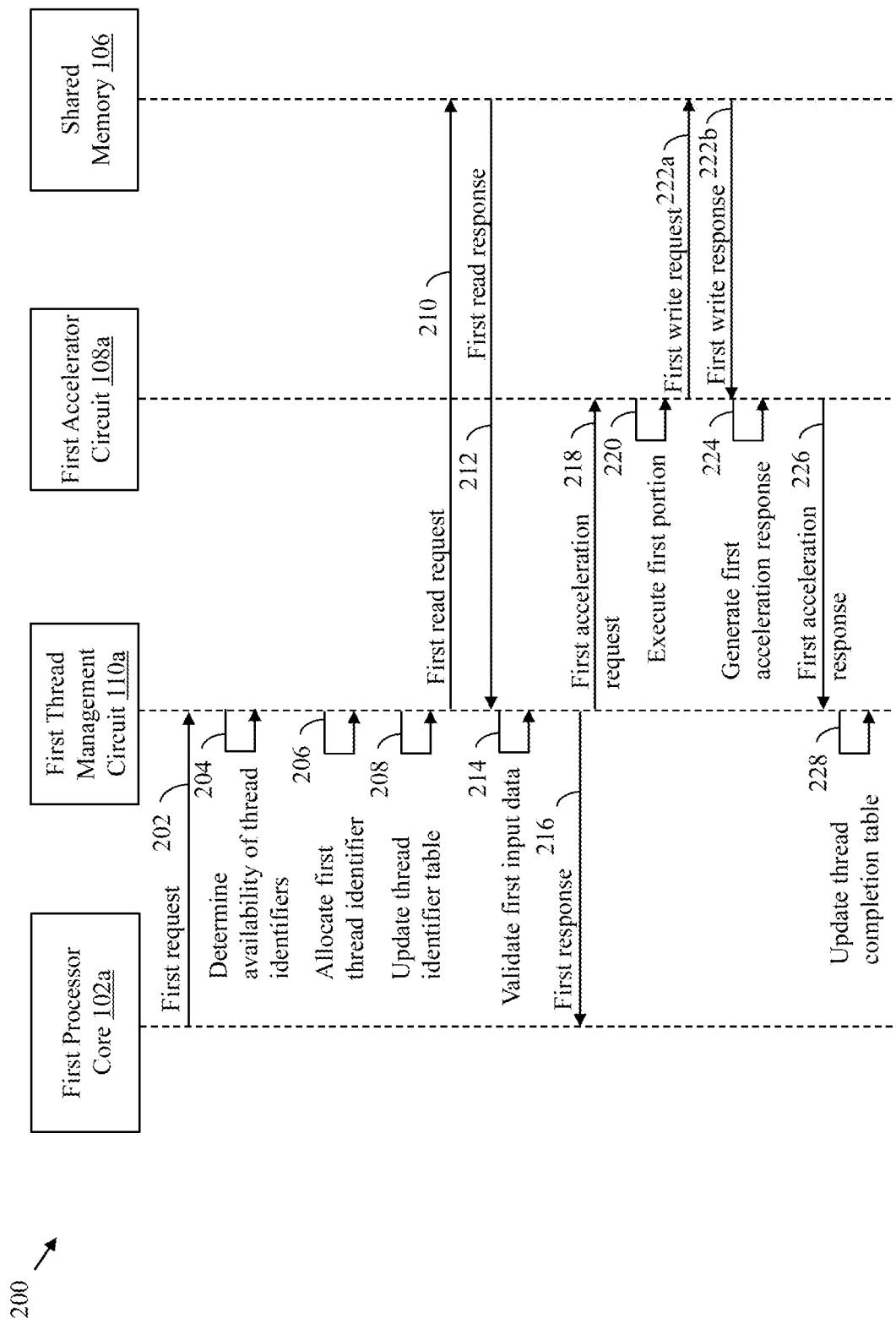
FIGS. 2A and 2B, collectively illustrate a process flow diagram that represents facilitation of accelerator thread management by a thread management circuit of FIG. 1 in accordance with an exemplary embodiment of the present disclosure.
Figure 2B:
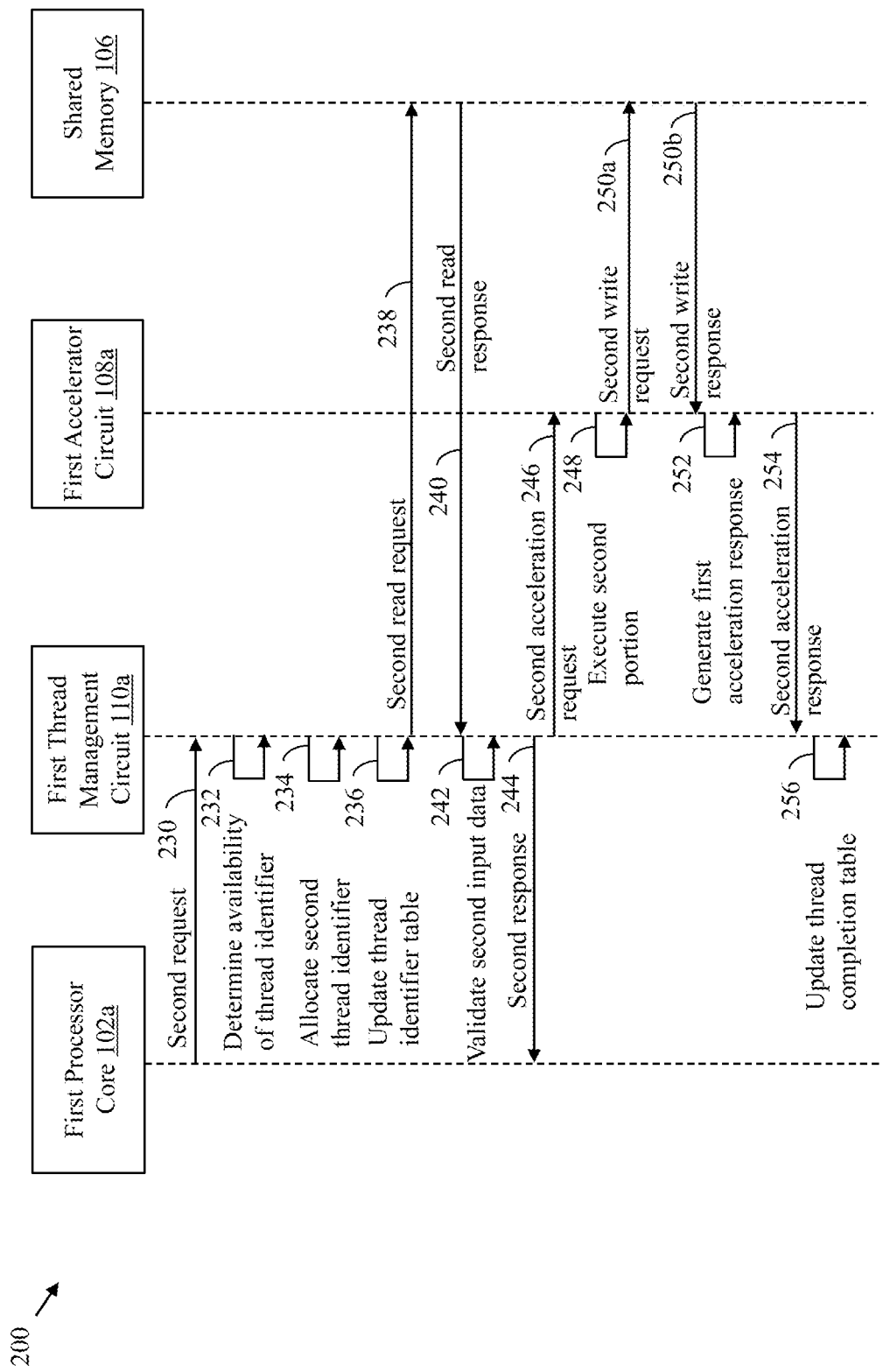

FIGS. 2A and 2B, collectively illustrate a process flow diagram 200 that represents facilitation of accelerator thread management by the first thread management circuit 110*a*, in accordance with an exemplary embodiment of the present disclosure. FIGS. 2A and 2B are explained in conjunction with FIG. 1.

With reference to FIG. 2A, the first processor core 102*a* that is configured to execute the application 112 communicates the first request to the first thread management circuit 110*a* by way of the set of communication buses 104 (as shown by arrow 202). In one embodiment, the first request is a function call for the execution of the first portion 112*a* by the first accelerator circuit 108*a*. The first request includes the identifier of the first processor core 102*a*, the identifier of the first accelerator circuit 108*a*, and/or an identifier of the first thread management circuit 110*a*. The first request further includes a first address in the shared memory 106 that stores first input data required for executing the first portion 112*a*. The first processor core 102*a* may be configured to write the first input data to the shared memory 106 at the first address prior to communicating the first request. The first request is further indicative of a requisite first set of operations to be performed by the first accelerator circuit 108*a* for executing the first portion 112*a*.

Based on the first request, the processing circuitry 114 is configured to determine an availability of a thread identifier in the thread identifier table 118 for allocation to the first processor core 102*a* for the execution of the first portion 112*a* (as shown by arrow 204). In one example, the thread identifier table 118 may indicate that all four thread identifiers of the first thread management circuit 110*a* are currently unallocated and are available for allocation. Based on the determination that one or more thread identifiers in the thread identifier table 118 are available, the processing circuitry 114 is configured to allocate one of the available thread identifiers (e.g., the first thread identifier) to the first processor core 102*a* for the execution of the first portion 112*a* (as shown by arrow 206). Following the allocation of the first thread identifier, the processing circuitry 114 is configured to update the thread identifier table 118 to indicate that the first thread identifier is allocated to the first processor core 102*a* (as shown by arrow 208). Updating of the thread identifier table 118 is described in detail in conjunction with FIGS. 4A-4E.

The processing circuitry 114 is further configured to communicate a first read request to the shared memory 106 (as shown by the arrow 210) for reading the first input data stored at the first address in the shared memory 106. The first read request includes the first address of the first input data. Based on the first read request, the processing circuitry 114 accesses the first address in the shared memory 106. Consequently, the shared memory 106 is configured to communicate, to the first thread management circuit 110*a*, a first read response (as shown by arrow 212). The first read response may indicate the first input data stored at the first address in the shared memory 106.

Based on the first read response, the processing circuitry 114 is further configured to validate the first input data stored at the first address (as shown by arrow 214). In other words, the processing circuitry 114 determines whether the first input data, stored at the first address, is valid data for the execution of the first portion 112*a*. In an embodiment, if the processing circuitry 114 fails to validate the first input data stored at the first address, the processing circuitry 114 may generate and communicate a first exception to the first processor core 102*a*. The first exception may indicate that the first input data stored at the first address is invalid.

In a non-limiting example, it is assumed that the processing circuitry 114 successfully validates the first input data stored at the first address. Based on the successful validation of the first input data, the processing circuitry 114 is configured to communicate a first response to the first processor core 102*a* (as shown by arrow 216). The first response includes the first thread identifier allocated to the first processor core 102*a* for the execution of the first portion 112*a*.

Further, based on the successful validation of the first input data, the processing circuitry 114 is configured to communicate a first acceleration request to the first accelerator circuit 108*a* for the execution of the first portion 112*a* by the first accelerator circuit 108*a* (as shown by arrow 218). In other words, the processing circuitry 114 communicates the first acceleration request based on the reading of the first input data stored at the first address. The first acceleration request includes the first thread identifier and the first address of the first input data. The first acceleration request is also indicative of the first set of operations to be performed on the first input data for executing the first portion 112*a*.

Based on the first acceleration request, the first accelerator circuit 108*a* is configured to execute the first portion 112*a* (as shown by arrow 220). The first accelerator circuit 108*a* executes the first portion 112*a* by performing the first set of operations on the first input data and generates a first execution result.

Upon execution of the first portion 112*a*, the first accelerator circuit 108*a* is configured to communicate a first write request to the shared memory 106 for writing to the shared memory 106, the first execution result (as shown by arrow 222*a*). When the first execution result is successfully written to the shared memory 106, the shared memory 106 communicates a first write response to the first accelerator circuit 108*a* (as shown by arrow 222*b*). Further, based on the first write response from the shared memory 106 (i.e., when the execution of the first portion 112*a* is complete), the first accelerator circuit 108*a* is configured to generate a first acceleration response (as shown by arrow 224) and communicate the first acceleration response to the first thread management circuit 110*a* (as shown by arrow 226). The first acceleration response includes the first thread identifier and is indicative of a completion of the execution of the first portion 112*a* by the first accelerator circuit 108*a*. The first acceleration response may further include a first result address where the first execution result is stored in the shared memory 106.

Based on the received first acceleration response, the processing circuitry 114 is configured to update the thread completion table 120 to indicate that the execution of the first portion 112*a*, allocated to the first thread identifier, is complete (as shown by arrow 228). Update of the thread completion table 120 is described in detail in conjunction with FIGS. 4A-4E.

In a non-limiting example, the execution of the first portion 112a may correspond to determination of a Fast Fourier Transform (FFT) of a first signal (i.e., the first input data). In such a scenario, the first request may include the first address of the first signal, stored in the shared memory 106, and the set of operations may be indicative of FFT to be performed on the first signal. The first execution result, stored at the first result address, may be the Fourier Transform of the first signal.

With reference to FIG. 2B, the first processor core 102a is further configured to communicate a second request to the first thread management circuit 110a by way of the set of communication buses 104 (as shown by arrow 230). For the sake of brevity, it is assumed that the second request is communicated after the updating of the thread completion table 120 based on the first acceleration response. However, it will be apparent to those of skill in the art that the second request may be communicated at any time-instance after the communication of the first request. In one embodiment, the second request is a function call for the execution of the second portion 112b by the first accelerator circuit 108a. In other words, the first processor core 102a communicates the second request to the first thread management circuit 110a for hardware-accelerated execution of the second portion 112b.

The second request includes the identifier of the first processor core 102a, the identifier of the first accelerator circuit 108a, and/or the identifier of the first thread management circuit 110a. The second request further includes a second address in the shared memory 106 that stores second input data required for executing the second portion 112b. The first processor core 102a may be configured write the second input data to the shared memory 106 prior to communicating the second request. The second request is further indicative of a second set of operations to be performed for executing the second portion 112b.

Based on the second request, the processing circuitry 114 is configured to determine an availability of a thread identifier in the thread identifier table 118 for allocation to the first processor core 102a for the execution of the second portion 112b (as shown by arrow 232). In one example, the thread identifier table 118 may indicate that the first thread identifier is already allocated to the first processor core 102a for the execution of the first portion 112a. The thread identifier table 118 may further indicate that each of the second through fourth thread identifiers is available for allocation. Based on the determination that one or more thread identifiers in the thread identifier table 118 are available, the processing circuitry 114 is configured to allocate one of the available thread identifiers (e.g., the second thread identifier) to the first processor core 102a for the execution of the second portion 112b (as shown by arrow 234). Following the allocation of the second thread identifier, the processing circuitry 114 is configured to update the thread identifier table 118 to indicate that the second thread identifier is allocated to the first processor core 102a (as shown by arrow 236). Updating of the thread identifier table 118 is described in detail in conjunction with FIGS. 4A-4E.

The processing circuitry 114 is further configured to communicate a second read request to the shared memory 106 (as shown by the arrow 238) for reading the second input data stored at the second address in the shared memory 106. The second read request includes the second address of the second input data. Based on the second read request, the processing circuitry 114 accesses the second address in the shared memory 106. Consequently, the shared memory 106 is configured to communicate, to the first thread management circuit 110a, a second read response (as shown by arrow 240). The second read response may indicate the second input data stored at the second address in the shared memory 106.

Based on the second read response, the processing circuitry 114 is further configured to validate the second input data stored at the second address (as shown by arrow 242). In other words, the processing circuitry 114 determines whether the second input data, stored at the second address, is valid data for the execution of the second portion 112b. In an embodiment, if the processing circuitry 114 fails to validate the second input data stored at the second address, the processing circuitry 114 may generate and communicate a second exception to the processor core 102a. The second exception may indicate that the second input data stored at the second address is invalid.

In a non-limiting example, it is assumed that the processing circuitry 114 successfully validates the second input data stored at the second address. Based on the successful validation of the second input data, the processing circuitry 114 is configured to communicate a second response to the first processor core 102a (as shown by arrow 244). The second response includes the second thread identifier allocated to the first processor core 102a for the execution of the second portion 112b. Further, the second response may be indicative of the communication of the second acceleration request for the execution of the second portion 112b.

Further based on the successful validation of the second input data, the processing circuitry 114 communicates a second acceleration request to the first accelerator circuit 108a for the execution of the second portion 112b (as shown by arrow 246). In other words, the processing circuitry 114 communicates the second acceleration request based on the reading of the second input data stored at the second address. The second acceleration request includes the second thread identifier and the second address of the second input data in the shared memory 106. The second acceleration request is also indicative of the second set of operations to be performed on the second input data for executing the second portion 112b.

Based on the second acceleration request, the first accelerator circuit 108a executes the second portion 112b (as shown by arrow 248). The first accelerator circuit 108a executes the second portion 112b by performing the second set of operations on the second input data and generates a second execution result.

Upon execution of the second portion 112b, the first accelerator circuit 108a is configured to communicate a second write request to the shared memory 106 for writing to the shared memory 106, the second execution result (as shown by arrow 250a). When the second execution result is successfully written to the shared memory 106, the shared memory 106 communicates a second write response to the first accelerator circuit 108a (as shown by arrow 250b). Further, based on the second write response from the shared memory 106 (i.e., when the execution of the second portion 112b is complete), the first accelerator circuit 108a is configured to generate a second acceleration response (as shown by arrow 252) and communicate the second acceleration response to the first thread management circuit 110a (as shown by arrow 254). The second acceleration response includes the second thread identifier and is indicative of a completion of the execution of the second portion 112b by the first accelerator circuit 108a. The second acceleration response may further include the second result address where the second execution result is stored in the shared memory 106.

Based on the received second acceleration response, the processing circuitry 114 is configured to update the thread completion table 120 to indicate that the execution of the second portion 112b, allocated to the second thread identifier, is complete (as shown by arrow 256). Updating of the thread completion table 120 is described in detail in conjunction with FIGS. 4A-4E.

Figure 3:
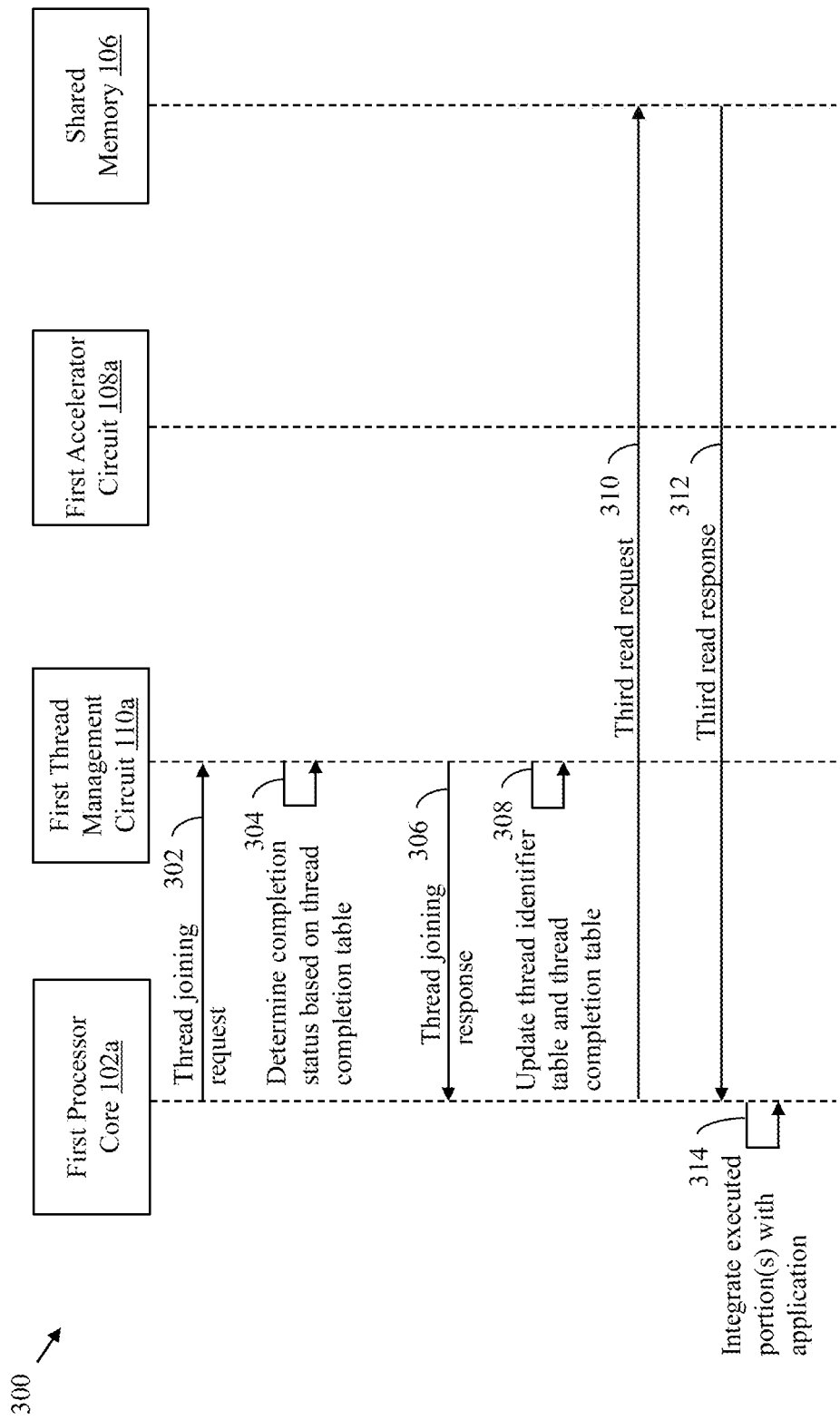
FIG. 3 illustrates a process flow diagram that represents facilitation of an integration of executed portions with an application by the thread management circuit of FIG. 1, in accordance with an exemplary embodiment of the present disclosure.

FIG. 3 is a process flow diagram 300 that represents facilitation of an integration of the executed first and second portions 112a and 112b with the application 112 by the first thread management circuit 110a, in accordance with an exemplary embodiment of the present disclosure. FIG. 3 is explained in conjunction with FIGS. 2A and 2B.

The first processor core 102a is configured to communicate a thread joining request to the first thread management circuit 110a (as shown by arrow 302). The first processor core 102a may communicate the thread joining request at any time-instance after the communication of the first request. In one embodiment, the thread joining request is of the first type (i.e., Join (id)) and includes the first thread identifier. Therefore, the thread joining request is a request for joining the first portion 112a.

In one embodiment, the first thread management circuit 110a receives the thread joining request after the reception of the first acceleration response. Based on the first thread identifier included in the thread joining request and the thread completion table 120, the first thread management circuit 110a is configured to determine a completion status of the first portion 112a that is allocated the first thread identifier (as shown by arrow 304). Based on the thread completion table 120 that is updated based on the first acceleration response, the processing circuitry 114 determines that the execution of the first portion 112a is complete. Consequently, the processing circuitry 114 is configured to communicate, to the first processor core 102a, a thread joining response (as shown by arrow 306). The thread joining response includes the first thread identifier and the first result address where the first execution result is stored in the shared memory 106. The thread joining response indicates to the first processor core 102a that the execution of the first portion 112a by the first accelerator circuit 108a is complete.

After communicating the thread joining response, the processing circuitry 114 is configured to update the thread identifier table 118 and the thread completion table 120 to indicate that the first thread identifier is available for re-allocation (as shown by arrow 308). In other words, the first thread identifier is now available for allocation to any other portion, of any application, for execution by the first accelerator circuit 108a.

Upon receiving the thread joining response, the first processor core 102a is configured to communicate a third read request to the shared memory 106 for reading the first execution result (as shown by arrow 310). The third read request includes the first result address. Based on the third read request, the shared memory 106 communicates a third read response, including the first execution result, to the first processor core 102a (as shown by arrow 312). Based on the third read response that includes the first execution result, the first processor core 102a integrates the executed first portion 112a with the application 112 (as shown by arrow 314). In other words, the first processor core 102a may use the first execution result to join the first portion 112a with the application 112. For example, the first processor core 102a may further execute one or more other portions (e.g., the third portion 112c) of the application 112 based on the first execution result. Methods of integrating or (joining) executed portions or threads in parallel programming or parallel computing environments are well known to those of skill in the art.

In another embodiment, the thread joining request of the first type is received after the first request, but prior to the completion of the execution of the first portion 112a. In such a scenario, the processing circuitry 114 halts the communication of the thread joining response until the thread completion table 120 indicates that execution of the first portion 112a is complete. In other words, the processing circuitry 114 waits until the thread completion table 120 indicates that execution of the first portion 112a is complete. When the thread completion table 120 indicates that the execution of the first portion 112a is complete, the processing circuitry 114 communicates the thread joining response to the first processor core 102a.

It will be apparent to a person of ordinary skill in the art that when the thread joining request is of the first type and includes the second thread identifier instead of the first thread identifier, similar steps may be followed for integrating the executed second portion 112b with the application 112.

In another embodiment, the thread joining request is of the second type (i.e., Join (all)) and is communicated by the first processor core 102a after the communication of the first and second requests. Upon receiving the thread joining request of the second type, the processing circuitry 114 is configured to determine a completion status of each portion (i.e., each previous portion) that is associated with the first processor core 102a and is currently allocated a thread identifier in the thread identifier table 118. The determination of the completion status of each portion is based on the thread identifier table 118 and the thread completion table 120. For example, the processing circuitry 114 determines a completion status of each of the first and second portions 112a and 112b that are associated with the first processor core 102a and are allocated the respective first and second thread identifiers. If the thread completion table 120 indicates that the execution of both the first and second portions 112a and 112b is complete, the processing circuitry 114 is configured to communicate a thread joining response to the first processor core 102a. The thread joining response includes the first and second thread identifiers, and the first and second result addresses where the respective first and second execution results are stored in the shared memory 106. The thread joining response indicates that the execution of the first and second portions 112a and 112b by the first accelerator circuit 108a is complete.

However, if the first thread management circuit 110a determines, based on the thread completion table 120, that the execution of any of the first and second portions 112a and 112b is incomplete, the processing circuitry 114 halts the communication of the thread joining response. The processing circuitry 114 halts the communication of the thread joining response until the thread completion table 120 indicates that execution of both the first and second portions 112a and 112b is complete. In other words, the processing circuitry 114 waits until the thread completion table 120 indicates that execution of the first and second portions 112a and 112b, that are allocated the respective first and second thread identifiers, is complete (i.e., completion status). When the thread completion table 120 indicates that the execution of the both the first and second portions 112a and 112b is complete, the processing circuitry 114 communicates the thread joining response to the first processor core 102a. The thread joining response includes the first and second thread identifiers and the first and second result addresses.

After the communication of the thread joining response, the processing circuitry 114 is configured to update the thread identifier table 118 to indicate that the first and second thread identifiers are available for re-allocation. In other words, the first and second thread identifiers are available for allocation to any other portion(s) of any application, for execution by the first accelerator circuit 108a.

Upon receiving the thread joining response, the first processor core 102a is configured to communicate a third read request to the shared memory 106 for reading the first and second execution results. The third read request includes the first and second result addresses. Based on the third read request, the shared memory 106 communicates a third read response, including the first and second execution results, to the first processor core 102a. Based on the third read response, the first processor core 102a integrates the executed first and second portions 112a and 112b with the application 112.

In another embodiment, the thread joining request is of the third type and is communicated after the communication of the first and second requests. Upon receiving the thread joining request of the third type, the processing circuitry 114 is configured to determine a completion status of each portion (i.e., each previous portion) that is associated with the first processor core 102a and is currently allocated a thread identifier in the thread identifier table 118. The determination of the completion status of each portion is based on the thread identifier table 118 and the thread completion table 120. For example, the processing circuitry 114 determines a completion status of each of the first and second portions 112a and 112b that are associated with the first processor core 102a and are allocated the first and second thread identifiers, respectively.

If the thread joining request is of the third type and the thread completion table 120 indicates that the execution of the first portion 112a is complete but the execution of the second portion 112b is incomplete, the processing circuitry 114 communicates a thread joining response to the first processor core 102a. The thread joining response includes the first result address and indicates of the completion of the execution of the first portion 112a. The thread joining response may further indicate that the execution of the second portion 112b is incomplete. In other words, if the thread joining request is of the third type and is received after the reception of the second request and the completion of the execution of the first portion 112a, but prior to the completion of the execution of the second portion 112b, the thread joining response that includes only the first result address is communicated to the first processor core 102a. Therefore, the processing circuitry 114 does not wait for the completion of the execution of the second portion 112b for communicating the thread joining response to the first processor core 102a.

As described in the foregoing, the first processor core 102a integrates the executed first portion 112a with the application 112, based on the first execution result. Further, the processing circuitry 114 updates the thread identifier table 118 to indicate that the first thread identifier is available for re-allocation.

However, if the thread joining request is of the third type and the thread completion table 120 indicates that the execution of both the first and second portions 112a and 112b is complete, the processing circuitry 114 communicates a thread joining response, including the first and second thread identifiers and the first and second result addresses, to the first processor core 102a. The thread joining response indicates that the execution of the first and second portions 112a and 112b is complete. As described in the foregoing, the first processor core 102a integrates the executed first and second portions 112a and 112b with the application 112, based on the first and second execution results, respectively. Further, the processing circuitry 114 updates the thread identifier table 118 to indicate that the first and second thread identifiers are available for re-allocation.

However, if the thread joining request is of the third type and if the thread completion table 120 indicates that the execution of neither the first portion 112a nor the second portion 112b is complete, the processing circuitry 114 communicates a completion-pending response to the first processor core 102a. The completion-pending response indicates that execution of neither the first portion 112a nor the second portion 112b is complete. In other words, the completion-pending response indicates that the execution of both the first and second portions 112a and 112b is pending. After receiving the completion-pending response, the processing circuitry 114 may again communicate another thread joining request to the first thread management circuit 110a after a pre-determined time-interval.

FIGS. 4A-4E, collectively illustrate the thread identifier table 118 and the thread completion table 120 at various time-instances in accordance with an exemplary embodiment of the present disclosure. FIGS. 4A-4E are explained in conjunction with FIGS. 2A, 2B, and 3.

Figure 4B:
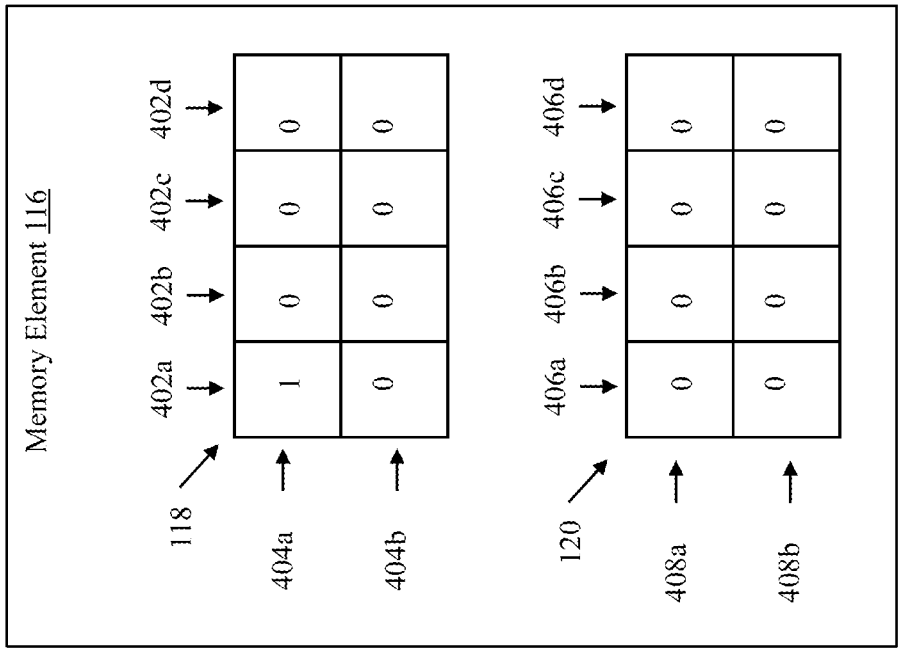
Figure 4A:
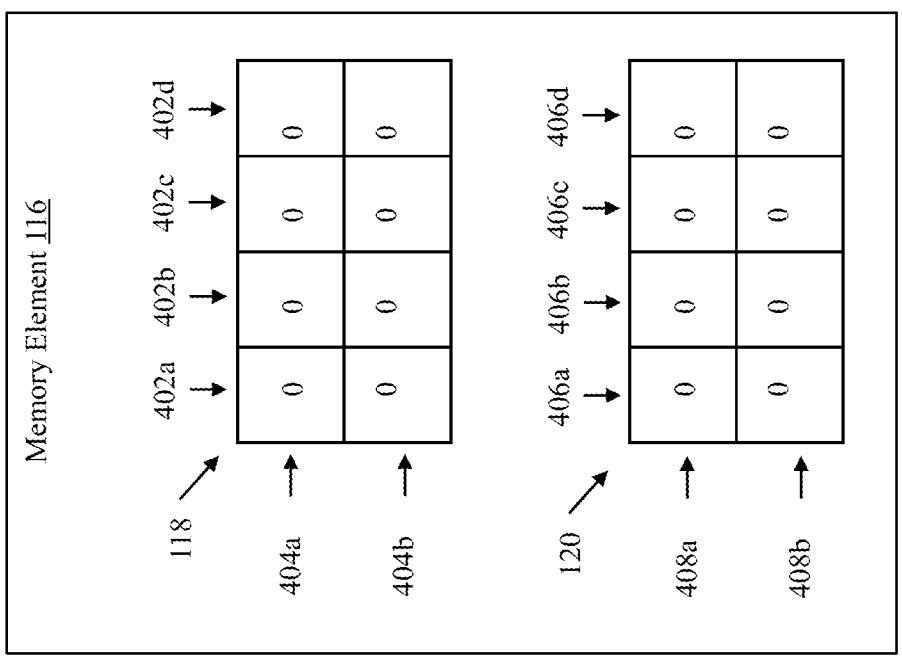

With reference to FIG. 4A, the thread identifier table 118 is shown to include first through fourth columns 402a-402d and first and second rows 404a and 404b. The first through fourth columns 402a-402d correspond to the first through fourth thread identifiers, respectively, and the first and second rows 404a and 404b correspond to the first and second processor cores 102a and 102b, respectively. FIG. 4A corresponds to a first time-instance that is prior to the reception of the first and second requests by the first thread management circuit 110a. Therefore, in FIG. 4A, each cell (not labelled) of the thread identifier table 118 indicates that each of the first through fourth thread identifiers is currently (i.e., at the first time-instance) not allocated to any of the first and second processor cores 102a and 102b.

In one embodiment, when a value of each cell of a column equals "0", the corresponding thread identifier is considered as unallocated by the processing circuitry 114. For example, as shown in FIG. 4A, each cell of the first column 402a equals "0" at the first time-instance. Thus, at the first time-instance, the first thread identifier corresponding to the first column 402a is currently available for allocation. As a corollary, when a value of a cell of a column equals "1", the corresponding thread identifier is considered as allocated by the processing circuitry 114.

In an alternate embodiment, when a value of each cell of a column equals "1", the corresponding thread identifier is considered as unallocated by the processing circuitry 114. As a corollary, when a value of a cell of a column equals "0", the corresponding thread identifier is considered as allocated by the processing circuitry 114.

The thread completion table 120 is shown to include fifth through eighth columns 406a-406d and third and fourth rows 408a and 408b. The fifth through eighth columns 406a-406d correspond to the first through fourth thread identifiers, respectively, and the third and fourth rows 408a and 408b correspond to the first and second processor cores 102a and 102b, respectively.

In one embodiment, when a value of any cell of a column equals "1", execution of a portion that is allocated a corresponding thread identifier (e.g., the first thread identifier) is considered as complete by the processing circuitry 114. As a corollary, when a value of each cell of a column (e.g., the first column 402a) equals "0", execution of a portion that is allocated a corresponding thread identifier is considered as incomplete by the processing circuitry 114. Since, at the first time-instance, the first through fourth thread identifiers are unallocated, a value of each cell of the thread completion table 120 equals "0".

In an alternate embodiment, when a value of any cell of a column equals "0", execution of a portion that is allocated a corresponding thread identifier (e.g., the first thread identifier) is considered as complete by the processing circuitry 114. As a corollary, when a value of each cell of a column (e.g., the first column 402a) equals "1", execution of a portion that is allocated a corresponding thread identifier is considered as incomplete by the processing circuitry 114.

With reference to FIG. 4B, a second time-instance after the reception of the first request by the first thread management circuit 110a, but prior to the reception of the first acceleration response by the first thread management circuit 110a is shown. At the second time-instance, based on the first request, the processing circuitry 114 allocates the first thread identifier to the first portion 112a. Thus, at the second time-instance, the processing circuitry 114 updates the thread identifier table 118 to update the value a first cell corresponding to the first column 402a and the first row 404a from '0' to "1", indicating that the first thread identifier is allocated to the first processor core 102a. At the second time-instance, the value of each cell of the thread completion table 120 still equals "0", since the first thread management circuit 110a is yet to receive the first acceleration response.

With reference to FIG. 4C, a third time-instance after the reception of the second request and the first acceleration response by the first thread management circuit 110a, but prior to the reception of the second acceleration response by the first thread management circuit 110a is shown. At the third time-instance, the thread identifier table 118 indicates that the first and second thread identifiers are allocated to the first processor core 102a. Thus, the values of the first cell and a second cell corresponding to the second column 402b and the first row 404a are updated to "1" to indicate that the first and second thread identifiers are allocated to the first processor core 102a. Further, at the third time-instance, the thread completion table 120 is updated to indicate the completion of the execution of the first portion 112a, based on the first acceleration response. Thus, the value of a third cell, of the thread completion table 120, corresponding to the fifth column 406a and the third row 408a is updated from '0' to "1" to indicate that the execution of the first portion 112a that was allocated the first thread identifier is complete.

With reference to FIG. 4D, a fourth time-instance after the reception of the first and second acceleration responses by the first thread management circuit 110a, but prior to the communication of the thread joining response by the first thread management circuit 110a is shown. At the fourth time-instance, the thread completion table 120 indicates the completion of the execution of the second portion 112b. Thus, at the fourth time-instance, the processing circuitry 114 updates the thread completion table 120 to indicate the completion of the execution of the second portion 112b, based on the received second acceleration response. The value of a fourth cell, of the thread completion table 120, corresponding to the sixth column 406b and the third row 408a is updated from "0" to "1" to indicate that the execution of the second portion 112b that was allocated the second thread identifier is complete.

Figure 4E:
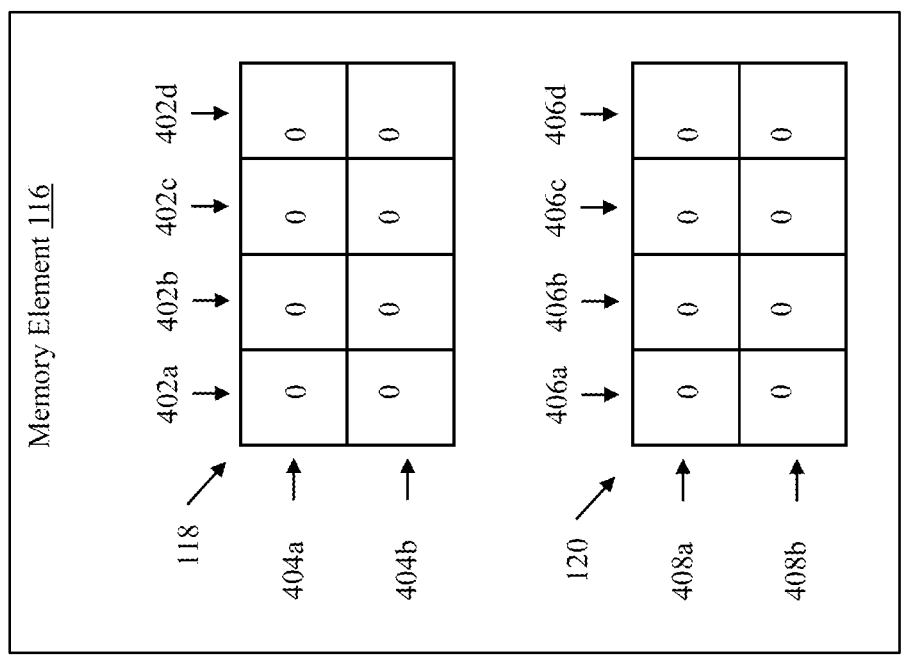

With reference to FIG. 4E, a fifth time-instance after the communication of the thread joining response to the first processor core 102a by the first thread management circuit 110a is shown. The thread identifier table 118 indicates that the first and second thread identifiers are available for re-allocation. In other words, at the fifth time-instance, the processing circuitry 114 updates the thread identifier table 118 and the thread completion table 120 based on the communication of the thread joining response. The values of the first and second cells are updated from "1" to "0", indicating that the first and second thread identifiers are available for re-allocation. Similarly, the values of the third and fourth cells are also updated from "1" to "0", since the first and second thread identifiers are unallocated and available at the fifth time-instance.

Figure 5A:
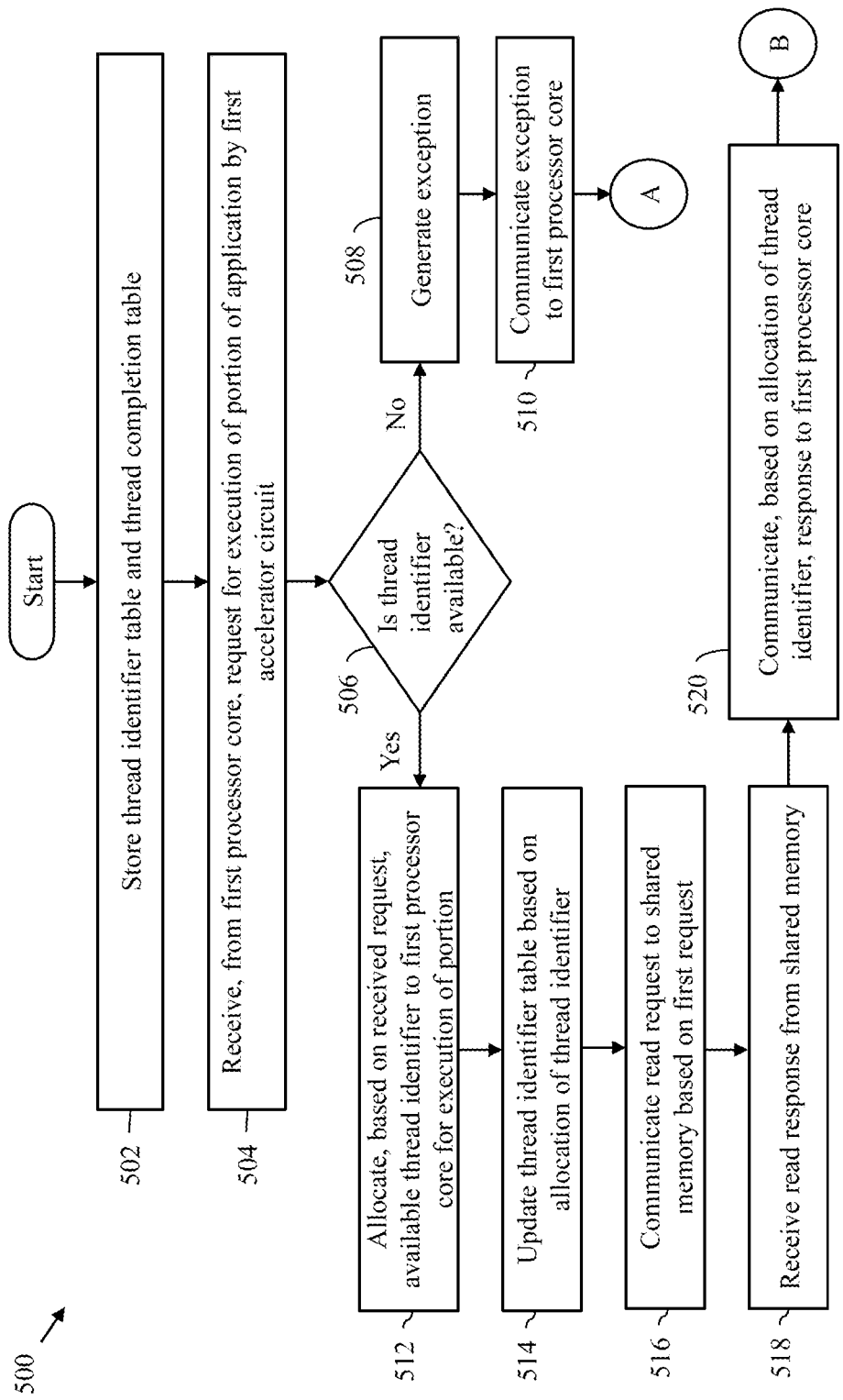
FIGS. 5A and 5B, collectively represent a flowchart that illustrates facilitation of accelerator thread management by the thread management circuit of FIG. 1 for execution of a portion of an application in accordance with an exemplary embodiment of the present disclosure.
Figure 5B:
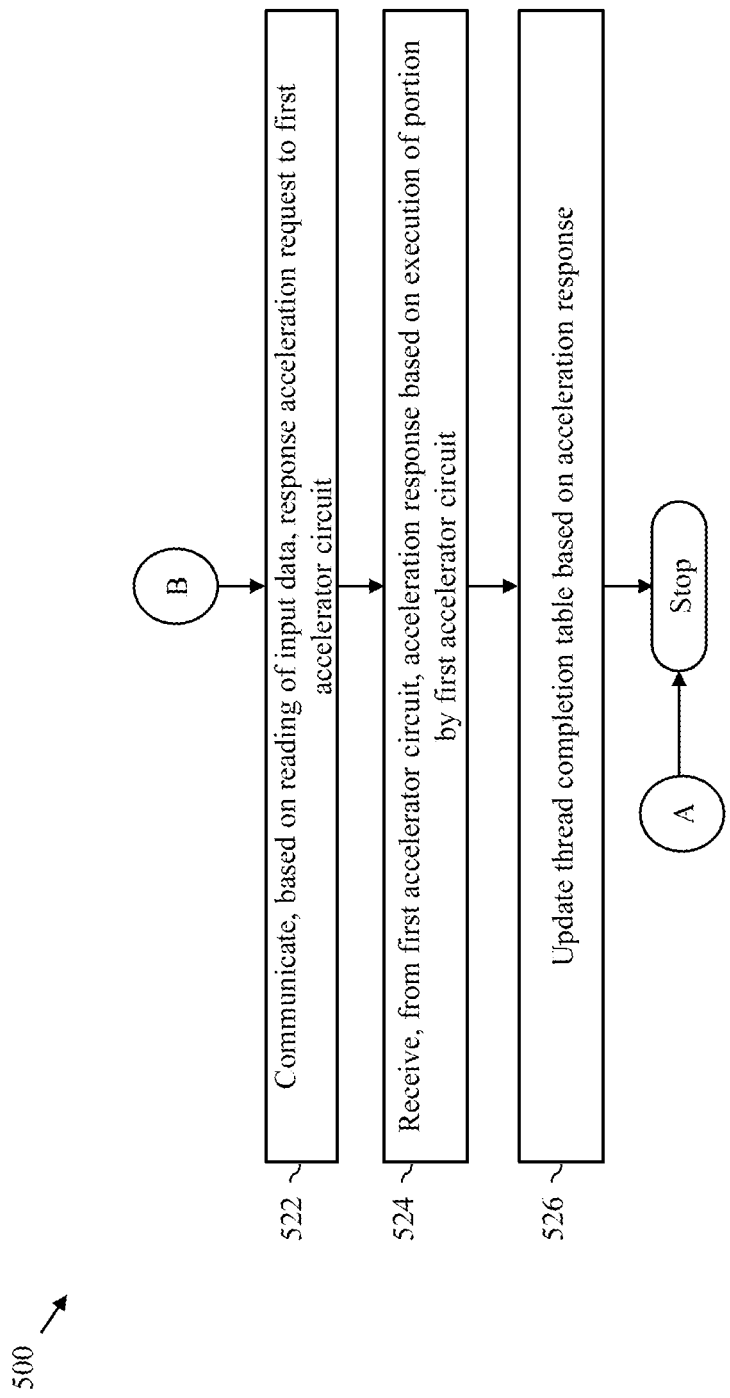

FIGS. 5A and 5B, collectively represent a flowchart 500 that illustrates facilitation of accelerator thread management by the first thread management circuit 110a for execution of a portion of the application 112 in accordance with an exemplary embodiment of the present disclosure. FIGS. 5A and 5B are described in conjunction with FIGS. 2A and 2B.

With reference to FIG. 5A, at step 502, the processing circuitry 114 stores the thread identifier table 118 and the thread completion table 120 in the memory element 116 of the first thread management circuit 110a. The thread identifier table 118 indicates an availability (e.g., "allocated" or "available for allocation") of each thread identifier, of the first through fourth thread identifiers, for execution of a portion (e.g., the first portion 112a). The thread completion table 120 is indicative of a completion status of each portion that is allocated a thread identifier of the first through fourth thread identifiers.

At step 504, the processing circuitry 114 receives, from the first processor core 102a, a request (e.g., the first request) for execution of a portion (e.g., the first portion 112a) of the application 112 by the first accelerator circuit 108a. At step 506, the processing circuitry 114 determines, based on the thread identifier table 118, whether a thread identifier is available for allocation to the first processor core 102a for the execution of the portion (e.g., the first portion 112a). If at step 506, the processing circuitry 114 determines that a thread identifier is not available for allocation to the first processor core 102a, step 508 is performed. At step 508, the processing circuitry 114 generates an exception (e.g., the first exception) indicating that no thread identifier is available for allocation. At step 510, the processing circuitry 114 communicates the generated exception to the first processor core 102a by way of the set of communication buses 104 and the process stops.

If at step 506, the processing circuitry 114 determines that a thread identifier (e.g., the first thread identifier) is available for allocation to the first processor core 102a, step 512 is performed. At step 512, the processing circuitry 114 allocates, based on the received request (e.g., the first request), the available thread identifier to the first processor core 102a for the execution of the portion by the first accelerator circuit 108a. At step 514, the processing circuitry 114 updates the thread identifier table 118 to indicate that the available thread identifier is allocated to the first processor core 102a. At step 516, the processing circuitry 114 communicates, to the shared memory 106, a read request (e.g., the first read request) for reading input data (e.g., the first input data) associated with the portion (as described in the foregoing description of FIG. 2A). At step 518, the processing circuitry 114 receives a read response (e.g., the first read response) from the shared memory 106 (as described in FIG. 2A). The processing circuitry 114 validates the input data indicated by the read response. At step 520, the processing circuitry 114 communicates, based on the allocation of the thread identifier, a response (e.g., the first response) to the first processor core 102a. The communicated response includes the allocated thread identifier.

With reference to FIG. 5B, at step 522, the processing circuitry 114 communicates, to the first accelerator circuit 108a, an acceleration request (e.g., the first acceleration request) for the execution of the portion by the first accelerator circuit 108a. The processing circuitry 114 communicates the acceleration request based on the reading of the input data. At step 524, the processing circuitry 114 receives an acceleration response (e.g., the first acceleration response) from the first accelerator circuit 108a, following a completion of the execution of the portion by the first accelerator circuit 108a. The acceleration response may be indicative of an address (e.g., the first result address) in the shared memory 106, where a result (e.g., the first execution result) of the execution of the portion is stored. At step 526, based on the received acceleration response, the processing circuitry 114 updates the thread completion table 120 to indicate that the execution of the portion allocated the thread identifier is complete.

While FIGS. 5A and 5B are explained with respect to the execution of the first portion 112a, it will be apparent to those of skill in the art that similar steps may be performed by the processing circuitry 114 for the facilitating accelerator thread management for the execution of the second portion 112b.

Figure 6A:
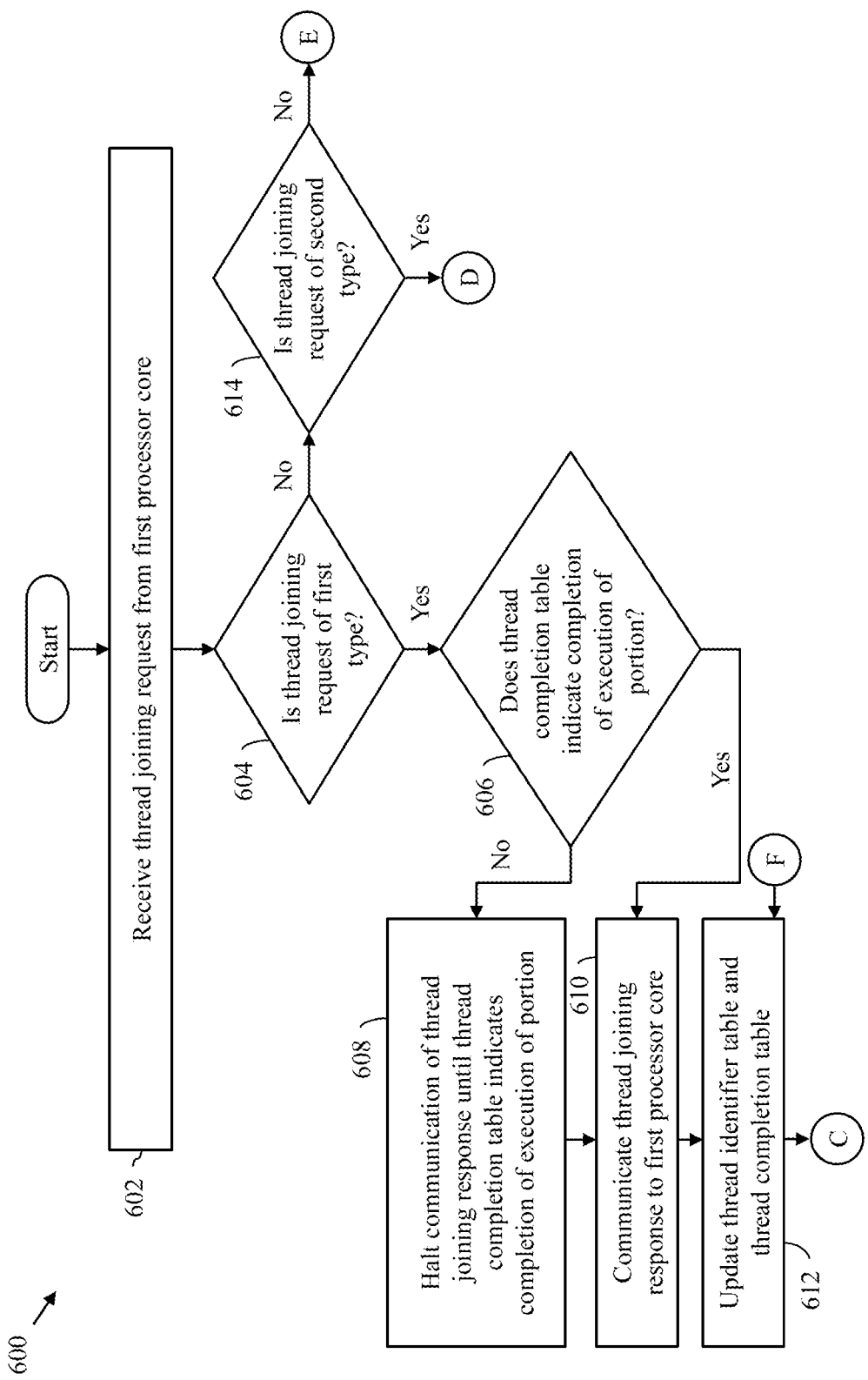
FIGS. 6A-6C, collectively represent a flowchart that illustrates facilitation of accelerator thread management by the thread management circuit of FIG. 1 for joining one or more executed portions with a corresponding application in accordance with an exemplary embodiment of the present disclosure.
Figure 6B:
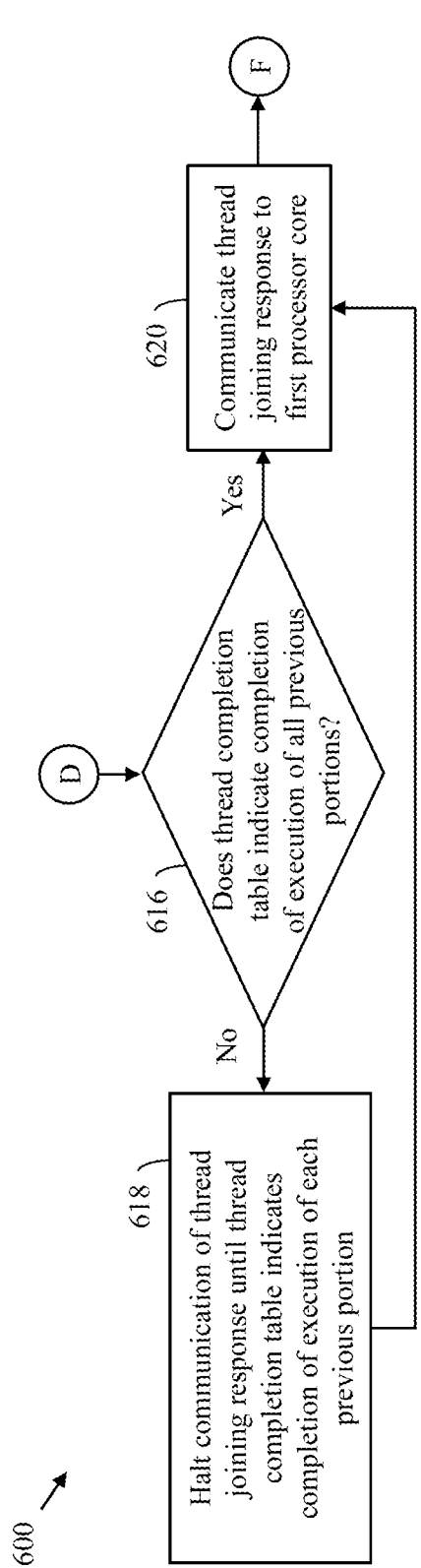
Figure 6C:
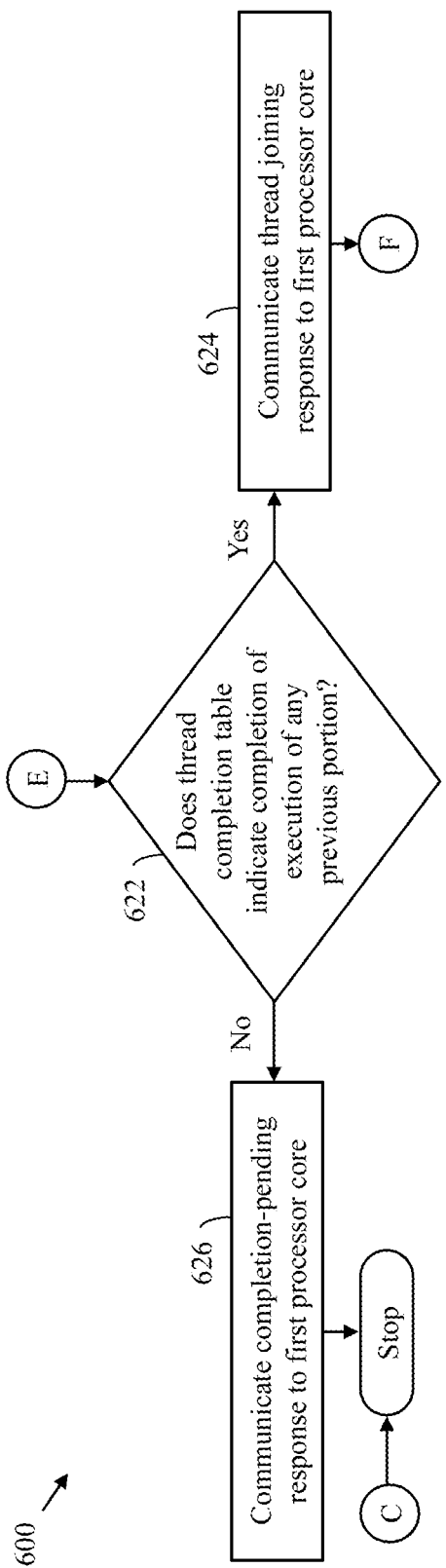

FIGS. 6A-6C, collectively represent a flowchart 600 that illustrates facilitation of accelerator thread management by the first thread management circuit 110a for joining one or more executed portions with the corresponding application 112 in accordance with an exemplary embodiment of the present disclosure.

With reference to FIG. 6A, at step 602, the first thread management circuit 110a receives the thread joining request from the first processor core 102a. The thread joining request may be received at any time-instance (e.g., the second through fourth time-instances) after the reception of the first request. At step 604, the processing circuitry 114 determines whether the thread joining request is of the first type. If at step 604, the processing circuitry 114 determines that the thread joining request is of the first type, step 606 is performed. At step 606, the processing circuitry 114 determines whether the thread completion table 120 indicates that the execution of a portion that corresponds to the thread joining request is complete. For example, if the thread joining request includes the first thread identifier, the processing circuitry 114 determines, based on the thread completion table 120, whether execution of the first portion 112a that is allocated the first thread identifier is complete.

If at step 606, the processing circuitry 114 determines that the thread completion table 120 does not indicate that the execution of the corresponding portion is complete, step 608 is performed. For example, when the thread joining request including the first thread identifier is received by the processing circuitry 114, the thread completion table 120 may indicate that the execution of the first portion 112a is incomplete. At step 608, the processing circuitry 114 halts communication of a thread joining response until the thread completion table 120 indicates that the execution of the portion corresponding to the thread joining request is complete. For example, the processing circuitry 114 waits until the first accelerator circuit 108a communicates the first acceleration response indicating that the execution of the first portion 112a by the first accelerator circuit 108a is complete. Upon receiving the first acceleration response from the first accelerator circuit 108a, the processing circuitry 114 updates the thread completion table 120 to indicate that the execution of the first portion 112a that is allocated the first thread identifier is complete. When the thread completion table 120 indicates that the execution of the portion is complete, step 610 is performed. If at step 606, the processing circuitry 114 determines, based on the thread completion table 120, that the execution of the portion corresponding to the thread joining request is complete, step 610 is performed.

At step 610, the processing circuitry 114 communicates a thread joining response to the first processor core 102a. The thread joining response includes the thread identifier (e.g., the first thread identifier) and a corresponding result address (e.g., the first result address) where a corresponding execution result (e.g., the first execution result) is stored in the shared memory 106. Further, the thread joining response may indicate that the execution of the portion is complete. At step 612, following the communication of the thread joining response, the processing circuitry 114 updates the thread identifier table 118 and the thread completion table 120 to indicate that the thread identifier is available for re-allocation and the process stops.

If at step 604, the processing circuitry 114 determines that the thread joining request is not of the first type, step 614 is performed. At step 614, the processing circuitry 114 determines whether the thread joining request is of the second type. If at step 614, the processing circuitry 114 determines that the thread joining request is of the second type, step 616 is performed.

With reference to FIG. 6B, at step 616, the processing circuitry 114 determines whether the thread completion table 120 indicates a completion of execution of each portion (i.e., each previous portion) that is associated with the first processor core 102a and currently allocated a thread identifier. In other words, the processing circuitry 114 determines whether execution of each portion (e.g., the first and second portions 112a and 112b) offloaded by the first processor core 102a is complete. If at step 616, the processing circuitry 114 determines that the thread completion table 120 does not indicate the completion of each portion (i.e., each previous portion), step 618 is performed.

At step 618, the processing circuitry 114 halts communication of a thread joining response until the thread completion table 120 indicates the completion of the execution of each previous portion. The communication of a thread joining response is halted based on a determination by the processing circuitry 114 that the execution of at least one of the first and second portions 112a and 112b is incomplete. The processing circuitry 114 waits until an acceleration response is received, from the first accelerator circuit 108a, for each thread identifier currently allocated to the first processor core 102a. When the thread completion table 120 indicates the completion of the execution of each previous portion, step 620 is performed. If at step 616, the processing circuitry 114 determines that the thread completion table 120 indicates the completion of each previous portion, step 620 is performed. At step 620, the processing circuitry 114 communicates the thread joining response to the first processor core 102a. The thread joining response may be indicative of each thread identifier allocated to each previous portion. Consequently, step 612 is performed. If at step 614, the processing circuitry 114 determines that the thread joining request is not of the second type (i.e. if the thread joining request is of the third type), step 622 is performed.

With reference to FIG. 6C, at step 622, the processing circuitry 114 determines whether the thread completion table 120 indicates a completion of execution of any previous portion. In other words, the processing circuitry 114 determines whether the thread completion table 120 indicates a completion of execution of any portion that is allocated a thread identifier, of the first through fourth thread identifiers, and corresponds to the first processor core 102*a*. If at step 622, the processing circuitry 114 determines that the thread completion table 120 indicates a completion of execution of one or more previous portions, step 624 is performed. At step 624, the processing circuitry 114 communicates the thread joining response to the first processor core 102*a*. The thread joining response includes the thread identifiers allocated to each of the one or more previous portions and a result address (e.g., the first result address) of each of the one or more previous portions. Consequently, step 612 is performed, where the processing circuitry 114 updates the thread identifier table 118 and the thread completion table 120 to indicate that the thread identifier allocated to each of the one or more previous portions is now available for re-allocation. If at step 622, the processing circuitry 114 determines that the thread completion table 120 does not indicate a completion of execution of any previous portion, step 626 is performed. At step 626, the processing circuitry 114 communicates, to the first processor core 102*a*, a completion-pending response indicating that the completion of each previous portion is pending (as described in the foregoing description of FIG. 3) and the process stops.

Thus, the first thread management circuit 110*a* facilitates seamless thread management in a parallel programming or a parallel computing environment that uses techniques such as multiple instruction, multiple data (MIMD) or single program, multiple data (SPMD). The first thread management circuit 110*a* is capable of receiving, from multiple processor cores, various portions (or threads) of various applications for execution by the corresponding accelerator circuit 108*a*. The thread identifier table 118 and the thread completion table 120, implemented by way of hardware in the memory element 116, enable fast and easy tracking of a completion status of each portion or thread received for execution. Dynamic allocation (and re-allocation) of thread identifiers (e.g., the first and second thread identifiers) results in optimized utilization of available thread identifiers, avoiding cumbersome software-based allocation of thread identifiers. The first thread management circuit 110*a* leverages hardware (e.g., the processing circuitry 114 and the memory element 116) for facilitating accelerator thread management for execution of portions (i.e., threads) and integration of the executed portions, which results in increased speeds and lower latency times for thread management in the processing system 100.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

What is claimed is:

1. A processing system, comprising:
a processor core configured to execute an application;
an accelerator circuit; and
a thread management circuit coupled to the processor core and the accelerator circuit, and configured to:
store therein, a thread identifier table and a thread completion table, wherein the thread identifier table has first groups of entries and second groups of entries, one of the first groups and second groups corresponding to rows of the thread identifier table and another of the first groups and second groups corresponding to columns of the thread identifier table, each first group associated with a respective processing core of a plurality of processing cores and each second group associated with a respective thread identifier of a plurality of thread identifiers, the associations of processing cores and thread identifiers to the respective first group and second group in the thread identifier table being predefined and the thread identifier table indicates for each processing core of the plurality of processing cores one of a first bit indication that a first thread identifier is allocated for the respective processing core and a second bit indication that the first thread identifier is not allocated for the respective processing core and wherein the thread completion table has third groups of entries and fourth groups of entries, one of the third groups and fourth groups corresponding to rows of the thread completion table and another of the third groups and fourth groups corresponding to columns of the thread completion table, each third group associated with a respective processing core of the plurality of processing cores and each fourth group associated with a respective thread identifier of the plurality of thread identifiers, the associations of processing cores and thread identifiers in the thread completion table to the respective third group and fourth group in the thread completion table being predefined and the thread completion table indicates for each processing core of the plurality of processing cores one of a third bit indication that execution of a first portion of the first thread identifier is not complete for the respective processing core and a fourth bit indication that execution of the first portion of the first thread identifier is complete for the respective processing core;
receive, from the processor core, a first request for execution of the first portion of the application by the accelerator circuit, wherein the processing core executes another portion of the application based on sending the first request;
allocate, based on the received first request and the first thread identifier of the processing core indicated by the thread identifier table being associated with the second bit indication, the first thread identifier to the processor core for the execution of the first portion by the accelerator circuit and update the second bit indication associated with the first thread identifier to the first bit indication;
communicate, based on the allocation of the first thread identifier, a first response to the processor core, wherein the first response includes the allocated first thread identifier;
communicate a first acceleration request including the first thread identifier to the accelerator circuit for the execution of the first portion;
receive, from the processor core, a thread joining request after the reception of the first request, wherein the processing core halts the execution of the other portion of the application in response to the sending of the thread joining request and until a result of the thread joining request is received; and communicate, to the processor core, a thread joining response including the first thread identifier based on the thread joining request, wherein the thread joining response is communicated to the processor core based on the fourth indication by the thread completion table that the execution of the first portion by the accelerator circuit is complete, and wherein the processor core is further configured to integrate the executed first portion with the application, based on the thread joining response, wherein the processing core integrates at least two portions of the application executed by the accelerator circuit;

wherein the processor core, the accelerator circuit, and the thread management circuit are directly coupled to a common communication bus.

2. The processing system of claim 1, wherein the accelerator circuit is configured to:

execute the first portion based on the first acceleration request received from the thread management circuit; and generate a first acceleration response when the execution of the first portion is complete, wherein the first acceleration response includes the first thread identifier, and wherein the thread management circuit is further configured to:

receive the first acceleration response from the accelerator circuit; and update, based on the first acceleration response, the thread completion table to indicate that the execution of the first portion by the accelerator circuit is complete.

3. The processing system of claim 1, wherein the thread joining request is of a first type and includes the first thread identifier.

4. The processing system of claim 1, wherein the thread management circuit is further configured to:

receive, from the processor core, a second request for execution of a second portion of the application by the accelerator circuit, wherein the second request is received after the first request;

allocate, based on the received second request, a second thread identifier available in the thread identifier table to the processor core for the execution of the second portion by the accelerator circuit;

communicate, based on the allocation of the second thread identifier, a second response to the processor core, wherein the second response includes the allocated second thread identifier; and communicate a second acceleration request including the second thread identifier to the accelerator circuit for execution of the second portion.

5. The processing system of claim 4, wherein when the thread joining request is of a second type and is received after the second request, the thread management circuit is further configured to:

determine based on the thread completion table whether the execution of the first and second portions by the accelerator circuit is complete; and halt the communication of the thread joining response based on the determination that the execution of at least one of the first and second portions by the accelerator circuit is incomplete.

6. The processing system of claim 5, wherein the thread joining response is communicated when the thread completion table indicates that the execution of the first and second portions is complete, wherein the thread joining response further includes the second thread identifier, and wherein the processor core is further configured to integrate the executed second portion with the application based on the thread joining response.

7. The processing system of claim 4, wherein when the thread joining request is of a third type and is received after the second request and prior to the completion of the execution of the second portion by the accelerator circuit, the thread management circuit is further configured to:

determine based on the thread completion table whether the execution of at least one of the first and second portions by the accelerator circuit is complete, wherein the thread joining response including the first thread identifier is communicated when the thread completion table indicates that the execution of the first portion is complete and the execution of the second portion is incomplete.

8. The processing system of claim 1, wherein the thread management circuit is further configured to update the thread identifier table after the communication of the thread joining response, to indicate that the first thread identifier is available for re-allocation.

9. The processing system of claim 1, further comprising a shared memory that is configured to store input data for the execution of the first portion by the accelerator circuit, wherein the thread management circuit is further configured to read, from the shared memory, the input data, and wherein the communication of the first acceleration request is based on the reading of the input data by the thread management circuit.

10. The processing system of claim 9, wherein the accelerator circuit is configured to write a result of the execution of the first portion to the shared memory, and wherein the processor core is further configured to read the result from the shared memory for integrating the executed first portion with the application.

11. A thread management circuit coupled with a processor core and an accelerator circuit for thread management, the thread management circuit comprising:

a memory element configured to store a thread identifier table and a thread completion table, wherein the thread identifier table has first groups of entries and second groups of entries, one of the first groups and second groups corresponding to rows of the thread identifier table and another of the first groups and second groups corresponding to columns of the thread identifier table, the associations of processing cores and thread identifiers to the respective first group and second group in the thread identifier table being predefined and the thread identifier table indicates for each processing core of the plurality of processing cores one of a first bit indication that a first thread identifier is allocated for the respective processing core and a second bit indication that the first thread identifier is not allocated for the respective processing core and wherein the thread completion table has third groups of entries and fourth groups of entries, one of the third groups and fourth groups corresponding to rows of the thread completion table and another of the third groups and fourth groups corresponding to columns of the thread completion table, each third group associated with a respective processing core of the plurality of processing cores and each fourth group associated with a respective thread identifier of a plurality of thread identifiers, the associations of processing cores and thread identifiers in the thread completion table to the respective third group and fourth group in the thread completion table being predefined and the thread completion table indicates for each processing core of the plurality of processing cores one of a third bit indication that execution of a first portion of the first thread identifier is not complete for the respective processing core and a fourth bit indication that execution of the first portion of the first thread identifier is complete for the respective processing core; and processing circuitry coupled to the memory element and configured to:
receive, from the processor core, a first request for execution of flail the first portion of an application by the accelerator circuit, wherein the processing core executes another portion of the application based on sending the first request;
allocate, based on the received first request and the first thread identifier of the processing core indicated by the thread identifier table being associated with the second bit indication, the first thread identifier to the processor core for the execution of the first portion by the accelerator circuit and update the second bit indication associated with the first thread identifier to the first bit indication;
communicate, based on the allocation of the first thread identifier, a first response to the processor core, wherein the first response includes the allocated first thread identifier;
communicate a first acceleration request including the first thread identifier to the accelerator circuit for the execution of the first portion;
receive, from the processor core, a thread joining request after the reception of the first request, wherein the processing core halts the execution of the other portion of the application in response to the sending of the thread joining request and until a result of the thread joining request is received; and
communicate, to the processor core, a thread joining response including the first thread identifier based on the thread joining request, wherein the thread joining response is communicated to the processor core based on the fourth indication by the thread completion table that the execution of the first portion by the accelerator circuit is complete, and wherein the executed first portion is integrated with the application, based on the thread joining response, wherein the processing core integrates at least two portions of the application executed by the accelerator circuit;
wherein the processor core, the accelerator circuit, and the thread management circuit are directly coupled to a common communication bus.

12. The thread management circuit of claim 11, wherein the processing circuitry is further configured to:
receive a first acceleration response from the accelerator circuit based on the execution of the first portion by the accelerator circuit; and
update, based on the first acceleration response, the thread completion table, to indicate that the execution of the first portion by the accelerator circuit is complete.

13. The thread management circuit of claim 11, wherein the thread joining request is of a first type and includes the first thread identifier.

14. The thread management circuit of claim 11, wherein the processing circuitry is further configured to:
receive, from the processor core, a second request for execution of a second portion of the application by the accelerator circuit, wherein the second request is received after the first request;
allocate, based on the received second request, a second thread identifier available in the thread identifier table to the processor core for the execution of the first portion by the accelerator circuit;
communicate, based on the allocation of the second thread identifier, a second response to the processor core, wherein the second response includes the allocated second thread identifier; and
communicate a second acceleration request including the second thread identifier to the accelerator circuit for execution of the second portion.

15. The thread management circuit of claim 14, wherein when the thread joining request is of a second type and is received after the second request, the processing circuitry is further configured to:
determine based on the thread completion table whether the execution of the first and second portions by the accelerator circuit is complete; and
halt the communication of the thread joining response based on the determination that the execution of at least one of the first and second portions by the accelerator circuit is incomplete, wherein the thread joining response is communicated when the thread completion table indicates that the execution of the first and second portions is complete, wherein the thread joining response further includes the second thread identifier, and wherein the executed second portion is further integrated with the application based on the thread joining response.

16. The thread management circuit of claim 14, wherein when the thread joining request is of a third type and is received after the second request and prior to the completion of the execution of the second portion by the accelerator circuit, the processing circuitry is further configured to:
determine based on the thread completion table whether the execution of at least one of the first and second portions by the accelerator circuit is complete, wherein the thread joining response is communicated when the thread completion table indicates that the execution of the first portion is complete and the execution of the second portion is incomplete.

17. The thread management circuit of claim 11, wherein the processing circuitry is further configured to update the thread identifier table after the communication of the thread joining response, to indicate that the first thread identifier is available for re-allocation.

18. A method for thread management, comprising:
storing, by a thread management circuit, a thread identifier table and a thread completion table therein, wherein the thread identifier table has first groups of entries and second groups of entries, one of the first groups and second groups corresponding to rows of the thread identifier table and another of the first groups and second groups corresponding to columns of the thread identifier table, each first group associated with a respective processing core of a plurality of processing cores and each second group associated with a respective thread identifier of a plurality of thread identifiers, the associations of processing cores and thread identifiers to the respective first group and second group in the thread identifier table being predefined and the thread identifier table indicates for each processing core of the plurality of processing cores one of a first bit indication that a first thread identifier is allocated for the respective processing core and a second bit indication that the first thread identifier is not allocated for the respective processing core and wherein the thread completion table has third groups of entries and fourth groups of entries, one of the third groups and fourth groups corresponding to rows of the thread completion table and another of the third groups and fourth groups corresponding to columns of the thread completion table, each third group associated with a respective processing core of the plurality of processing cores and each fourth group associated with a respective thread identifier of a plurality of thread identifiers, the associations of processing cores and thread identifiers in the thread completion table to the respective third group and fourth group in the thread completion table being predefined and the thread completion table indicates for each processing core of the plurality of processing cores one of a third bit indication that execution of a first portion of the first thread identifier is not complete for the respective processing core and a fourth bit indication that execution of the first portion of the first thread identifier is complete for the respective processing core;

receiving, by the thread management circuit, from a processor core, a first request for execution of flail the first portion of an application by an accelerator circuit, wherein the processing core executes another portion of the application based on sending the first request;

allocating, by the thread management circuit, based on the received first request and the first thread identifier of the processing core indicated by the thread identifier table being associated with the second bit indication, the first thread identifier to the processor core for the execution of the first portion by the accelerator circuit and updating the second bit indication associated with the first thread identifier to the first bit indication;

communicating, by the thread management circuit, based on the allocation of the first thread identifier, a first response to the processor core, wherein the first response includes the allocated first thread identifier;

communicating, by the thread management circuit, a first acceleration request including the first thread identifier to the accelerator circuit for the execution of the first portion;

receiving, by the thread management circuit, from the processor core, a thread joining request after the reception of the first request, wherein the processing core halts the execution of the other portion of the application in response to the sending of the thread joining request and until a result of the thread joining request is received; and communicating, by the thread management circuit, to the processor core, a thread joining response based on the thread joining request, wherein the thread joining response is communicated to the processor core based on an indication by the thread completion table that the execution of the first portion by the accelerator circuit is complete, and wherein the executed first portion is integrated with the application by the processor core, based on the thread joining response, wherein the processing core integrates at least two portions of the application executed by the accelerator circuit;

wherein the processor core, the accelerator circuit, and the thread management circuit are directly coupled to a common communication bus.

19. The method of claim 18, further comprising:

receiving, by the thread management circuit, a first acceleration response from the accelerator circuit based on the execution of the first portion by the accelerator circuit; and updating, by the thread management circuit, the thread completion table, based on the first acceleration response, to indicate that the execution of the first portion by the accelerator circuit is complete.

20. The method of claim 18, further comprising updating, by the thread management circuit, the thread identifier table, after the communication of the thread joining response, to indicate that the first thread identifier is available for re-allocation.

* * * * *